(12) United States Patent
Parrish et al.

(10) Patent No.: US 6,785,270 B1
(45) Date of Patent: *Aug. 31, 2004

(54) TDM SWITCHING SYSTEM AND ASIC DEVICE

(75) Inventors: Brent K. Parrish, Hollis, NH (US); Werner E. Niebel, Merrimack, NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/430,828

(22) Filed: May 6, 2003

Related U.S. Application Data

(63) Continuation of application No. 09/327,700, filed on Jun. 8, 1999, now Pat. No. 6,587,461.

(51) Int. Cl.[7] .............................................. H04L 12/50
(52) U.S. Cl. ........................ 370/369; 370/364; 370/387
(58) Field of Search ................................ 370/351, 359, 370/360, 362–364, 369, 374–379, 389, 421, 423, 429, 442, 458, 358, 365

(56) References Cited

U.S. PATENT DOCUMENTS

| | | | | |
|---|---|---|---|---|
| 4,804,956 A | * | 2/1989 | Boxall | 370/380 |
| 4,855,996 A | * | 8/1989 | Douskalis | 370/545 |
| 5,105,421 A | | 4/1992 | Gingell | 370/363 |
| 5,696,788 A | * | 12/1997 | Choi et al. | 714/736 |
| 5,724,343 A | | 3/1998 | Pain et al. | 370/242 |
| 5,751,710 A | | 5/1998 | Crowther et al. | 370/423 |
| 5,991,295 A | | 11/1999 | Tout et al. | 370/395.7 |
| 6,157,638 A | | 12/2000 | Tayloe et al. | 370/358 |
| 6,353,619 B1 | | 3/2002 | Banas et al. | 370/419 |
| 6,424,659 B2 | | 7/2002 | Viswanadham et al. | 370/389 |
| 6,587,461 B1 | * | 7/2003 | Parrish et al. | 370/387 |

* cited by examiner

*Primary Examiner*—John Pezzlo
*Assistant Examiner*—David Odland
(74) *Attorney, Agent, or Firm*—Baker Botts L.L.P.

(57) ABSTRACT

In another embodiment, an ASIC device includes a first RAM that stores a code for each of multiple first time slots. Each code is combined with corresponding data from a first bus to specify a previously stored operation. A second RAM receives the combined data and code for each first time slot and applies the specified operation for each first time slot to generate modified data for each first time slot. A third RAM stores information specifying a second time slot to correspond to each first time slot and communicates the information for each second time slot as an address. A fourth RAM stores the modified data for a previous frame and the modified data for a current frame, locates the modified data for each first time slot of the previous frame according to the address, and communicates the modified data for each time slot of the previous frame to a second bus in the corresponding second time slot while the modified data for the current frame is being stored.

18 Claims, 13 Drawing Sheets

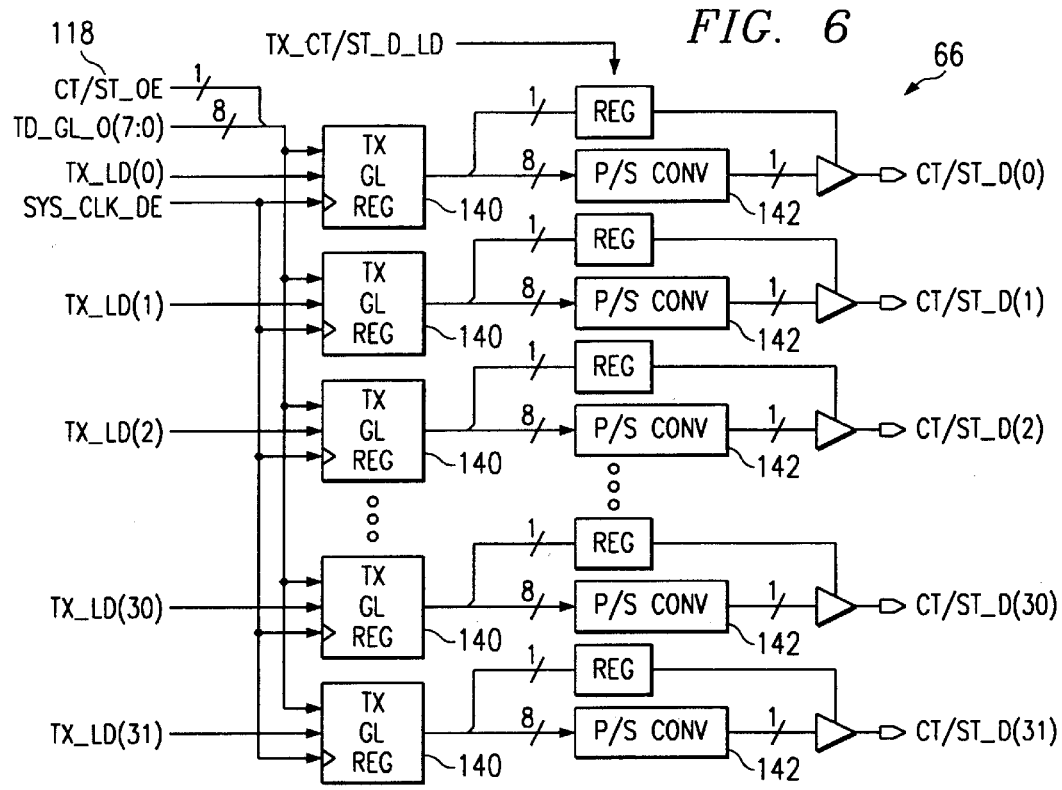

TDM SWITCHING SYSTEM AND ASIC DEVICE

RELATED APPLICATIONS

This application is a continuation of U.S. patent application Ser. No. 09/327,700 filed Jun. 8, 1999 entitled "TDM Switching System and ASIC Device," now U.S. Pat. No. 6,587,461 B1.

TECHNICAL FIELD OF THE INVENTION

This invention relates to the field of telecommunications, and more particularly to a TDM switching system and ASIC complex.

BACKGROUND

Many telecommunications devices include backplanes for transmitting digital information between components of the devices. For example, a telecommunications switching system might include a backplane for transmitting digital data representing voice signals between cards associated with incoming and outgoing ports. A switching system would also include a switching mechanism to associate incoming data received at an incoming port with an appropriate outgoing port and to route the incoming data to the outgoing port. Within a time-division multiplexing (TDM) switching system, this switching mechanism must receive the incoming data for each time slot, determine the outgoing port for the data for each time slot, and route the data for each time slot to the appropriate outgoing port. Since each time slot may be associated with a corresponding call between persons, computers, or other entities, successful operation of the system in many instances depends on the ability of the switching mechanism to accomplish these goals with tremendous accuracy and speed while meeting the capacity requirements placed on the system.

As the telecommunications industry continues to dominate the growth of the global economy, meeting the accuracy, speed, and capacity requirements placed on a switching system, while reducing to the extent practicable the footprint, manufacturing cost, and power consumption of the switching mechanism itself, becomes increasingly important. However, prior switching mechanisms and techniques are often inadequate to satisfy these needs, at least partially because of the many hardware components and associated circuitry typically required for their implementation. Since each additional component associated with a switching mechanism in general adds to its footprint, manufacturing cost, and power consumption, previous techniques involving relatively large number of such components become less desirable as switching systems become smaller and port density increases. Previous switching mechanisms and techniques do not adequately integrate the functionalities associated with TDM switching and do not fully realize the many technical advancements associated with design and fabrication of application-specific integrated circuits (ASIC). These and other deficiencies become particularly apparent when previous mechanisms and techniques are incorporated into high availability backplane environments of modem TDM switching systems.

SUMMARY OF THE INVENTION

According to the present invention, certain disadvantages and problems associated with TDM switching systems may be reduced or eliminated.

In one embodiment, a system for switching data between a plurality of network interfaces includes a backplane and multiple cards coupled to the backplane. Each card includes multiple ASIC devices. Each ASIC device is associated with a subset of the network interfaces and capable of switching data from an associated incoming network interface for communication to an outgoing network interface. At least one ASIC device on a particular card is an internally switching ASIC device capable of communicating switched data to an outgoing network interface also associated with the card. Remaining ASIC devices on the card are externally switching ASIC devices each capable of communicating switched data to one or more other cards, using the backplane, for communication to one or more outgoing network interfaces associated with the other cards.

In another embodiment, an ASIC device includes a first RAM that stores a data processing code for each of multiple first time slots, each code able to combine with corresponding data from the first bus to specify a previously stored data processing operation. A second RAM receives the combined data and code for each first time slot and applies the specified operation for each first time slot to generate modified data for each first time slot. A third RAM stores information specifying a second time slot to correspond to each first time slot and communicates the information for each second time slot as an address. A fourth RAM that includes at least first and second portions stores the modified data for a previous frame in the first portion and the modified data for a current frame in the second portion, locates the modified data for each first time slot of the previous frame according to the address, and communicates the modified data for each time slot of the previous frame from the first portion to the second bus in the corresponding second time slot while the modified data for the current frame is being stored.

Particular embodiments of the present invention may provide one or more technical advantages. For example, in certain embodiments, a switching system includes multiple ASIC devices on each network interface card, at least one of which allows data to be switched from an associated incoming network interface to an outgoing network interface associated with the same card. Remaining ASIC devices allow data to be switched from an associated incoming network interface to outgoing network interfaces associated with one or more other cards in the system. Using this approach, certain embodiments may allow for increased scalability and port density while reducing manufacturing cost and may take full advantage of ASIC devices designed and fabricated specifically for TDM switching.

In certain embodiments, an ASIC device provides TDM switching capabilities without the many hardware components and associated circuitry typically required for previous TDM switching architectures. In certain embodiments, the ASIC device may provide speed, accuracy, and reliability suitable for high availability backplane environments with reduced footprint, manufacturing cost, power consumption, and other undesirable characteristics. These benefits may become increasingly important as port density increases, making certain embodiments even more desirable for incorporation in modern TDM switching systems. Moreover, in certain embodiments, the ASIC device provides enhanced data processing, gain/law conversion for example, on a per call basis using a statically programmed look-up table and dynamically programmed codes to specify operations stored in the look-up table. Certain embodiments may preserve data integrity during switching operations using a triple bucket RAM and associated write and read strategies, detect faults in the data path, support multiple serial data bus standards, and provide other benefits. These benefits may be particularly apparent in a high availability backplane environment.

BRIEF DESCRIPTION OF THE DRAWINGS

To provide a more complete understanding of the present invention and further features and advantages thereof, reference is now made to the following description taken in conjunction with the accompanying drawings, in which:

FIG. 6 illustrates example components in a transmit CT/ST section of a transmit data path;

FIG. 7 illustrates example components in a receive CT/ST section of a receive data path;

DESCRIPTION OF EXAMPLE EMBODIMENTS

Figure 1:
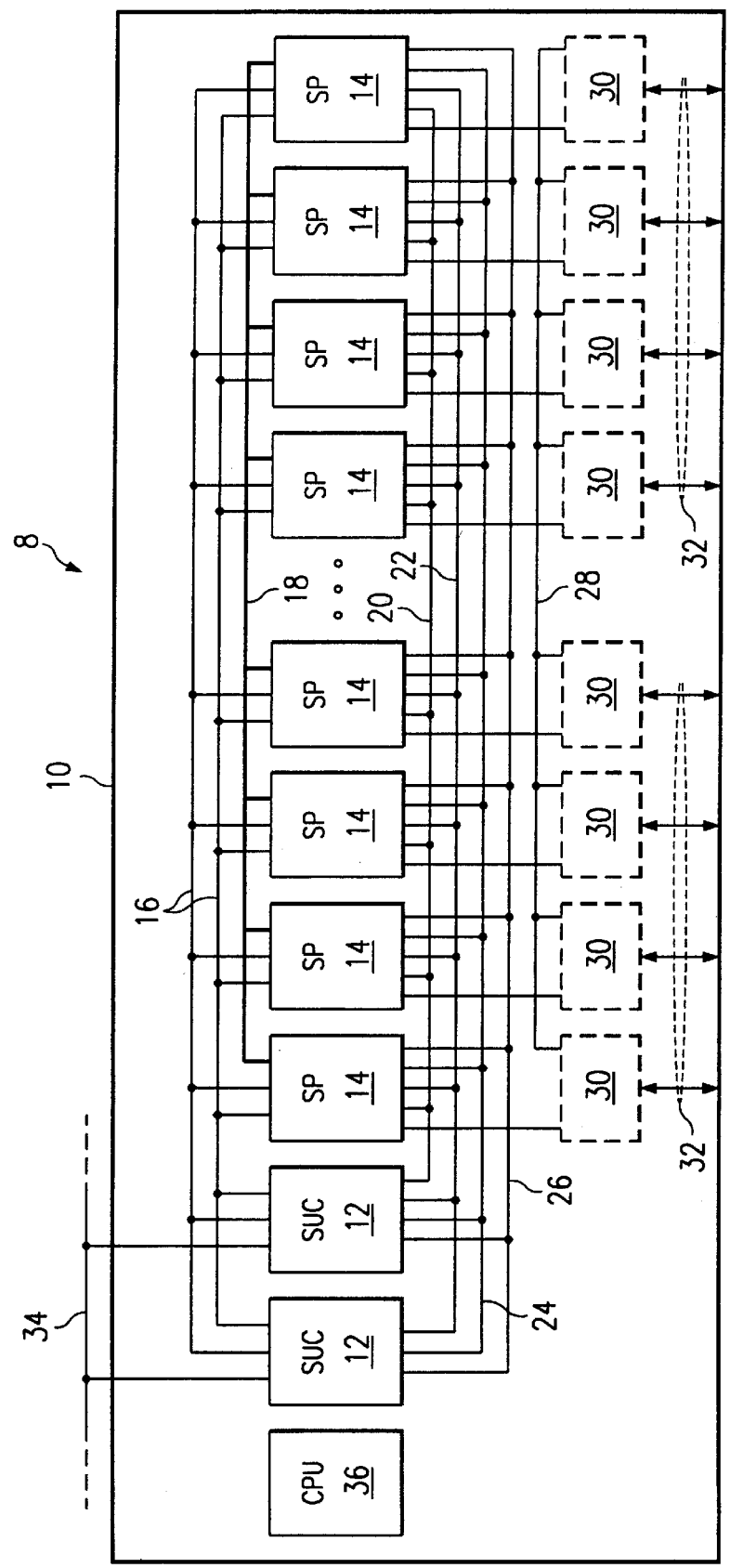
FIG. 1 illustrates an example system including at least one switching unit.

FIG. 1 illustrates an example system 8 including one or more switching units 10. In one embodiment, each switching unit 10 is a programmable switching unit that switches time division multiplexed (TDM), packet-based, or other suitable digital signals associated with voice, data, or other appropriate traffic between incoming and outgoing ports, lines, trunks, or other suitable telecommunications network interfaces. In general, switching unit 10 may operate at least in part subject to control of suitable software within one or more associated host computers and may be coupled to such host computers using one or more suitable communications links. Although switching unit 10 is discussed, those skilled in the art appreciate that the present invention may apply similarly to a wide variety of other telecommunications devices and that the present invention encompasses all such applications.

In one embodiment, switching unit 10 includes two or more redundant switching unit controllers (SUC) 12 coupled to one another and to multiple service providers (SP) 14 using one or more suitable buses. Each switching unit controller 12 and each service provider 14 is a card supporting appropriate integrated circuits, buses, circuitry, and any other suitable electrical components and may be shelf-mounted, rack-mounted, or otherwise removably installed within switching unit in accordance with particular needs. Switching unit controllers 12 generally cooperate to control selected aspects of the operation of service providers 14 and other components within switching unit 10. Service providers 14 communicate digital signals with one another using a backplane, midplane, or other switching fabric 16 that in a particular embodiment supports up to 16,384 time slots, corresponding to as many as 16,384 ports associated with switching unit 10.

Service providers 14 generally communicate between backplane 16 and suitable network interfaces to allow switching unit 10 to communicate information with and to switch the digital signals associated with these interfaces. Service providers 14 may communicate with network interfaces of a single or multiple types, for example and not by way of limitation, T1 interfaces, E1 interfaces, Integrated Services Digital Network (ISDN) interfaces, Signaling System 7 (SS7) interfaces, Optical Carrier level-3 (OC-3) or other optical interfaces, or any other suitable interfaces, in any suitable combination. Some or all service providers 14 may support different type of network interfaces than some or all other service providers 14. For example, one or more service providers 14 may support T1 interfaces while one or more other service providers 14 support OC-3 interfaces. Service providers 14 may have a peer-to-peer or any suitable hierarchical relationship. Some or all switching unit controllers 12 and service providers 14 may be hot insertable, hot pluggable, hot swappable, or otherwise readily replaceable during the operation of switching unit 10 to support high availability requirements.

In general, switching unit controllers 12 and service providers 14 use control bus 18 to communicate suitable command, control, and administrative messages during the operation of switching unit 10. Control bus 18 and its associated physical layer protocol provide a local area network that couples switching unit controllers 12 and service providers 14 within the backplane environment of switching unit 10, which may be a high availability backplane environment. Control bus 18 and its operation are described more fully in copending U.S. application Ser. No. 09/328,171 and U.S. Pat. No. 6,425,009. In addition to control bus 18, switching unit controllers 12 and service providers 14 may be coupled using an appropriate combination of synchronization bus 20, reset bus 22, isolation bus 24, and power bus 26 according to particular needs. As described more fully below, a system clock signal provides a "heartbeat" or timing reference for the synchronous digital communications among switching unit controllers 12 and service providers 14 over backplane 16, control bus 18, synchronization bus 20, reset bus 22, isolate bus 24, and power bus 26 within the backplane environment of switching unit 10. One or more of these buses may be redundant and may further incorporate additional mechanisms and techniques to support high availability requirements. Associated with service providers 14 are input/output (I/O) modules 30 that in general support incoming and outgoing communications between service providers 14 and associated network interfaces using associated links 32. Protection bus 28 couples I/O modules 30 and operates in cooperation with other components of switching unit 10 to provide protection switching and other capabilities generally desirable in preventing a single point of failure from propagating within switching unit 10 and satisfying high availability requirements. A suitable protection technique involving protection bus 28 is described more fully in copending U.S. Pat. No. 6,550,016. One or more central processing units (CPU) 36 support suitable software and cooperate with other components of switching unit 10 to facilitate switching in accordance with the present invention. Where appropriate, reference to CPU 36 includes reference to some or all associated software unless otherwise indicated.

In one embodiment, switching unit controllers 12 and service providers 14 each include an application specific integrated circuit (ASIC) complex to control some or all of the operations of switching unit controller 12 or service provider 14 with respect to TDM switching, clock synchronization, frame synchronization, and associated error detection and fault protection, among other appropriate responsibilities. Each ASIC complex may include one or more ASIC devices each providing the same, partially overlapping, or different functionality than one or more other ASIC devices within the ASIC complex. In a particular embodiment, the ASIC complex within each switching unit controller 12 supports a single ASIC device and the ASIC complex within each service provider 14 supports up to five ASIC devices, depending on the number of ports associated with switching unit 10 and any other suitable factors. CPU 36 and associated software may cooperate with one or more ASIC complexes to facilitate operation of the present invention within switching unit 10. Although a single CPU 36 is shown, the present invention contemplates CPU 36 including multiple CPUs, microprocessors, or other suitable computers distributed, in whole or in part, among some or all of the cards within switching unit 10.

One or more switching unit controllers 12 within a particular switching unit 10 may be coupled using network 34 to one or more switching unit controllers 12 within other switching units 10, one or more associated host computers, or one or more other network components, in any suitable combination. Network 34 may be a shared or dedicated local area network (LAN) supporting Ethernet or any other communications protocol, a suitable wide area network (WAN), or any other appropriate network. In one embodiment, network 34 supports a secure 100BaseT Ethernet link and one or more higher level protocols, for example, TCP/IP (Transmission Control Protocol/Internet Protocol), UDP/IP (User Datagram Protocol/Internet Protocol), or another appropriate protocol. A service provider 14 needing to communicate with a service provider 14 located in another switching unit 10 does so using one of its associated switching unit controllers 12 as a gateway to network 34. Switching unit controller 12 collects and buffers message packets from service provider 14, reformats the message packets as appropriate, and transmits the message packets to a switching unit controller 12 in the switching unit 10 associated with the destination service provider 14.

Figure 2:
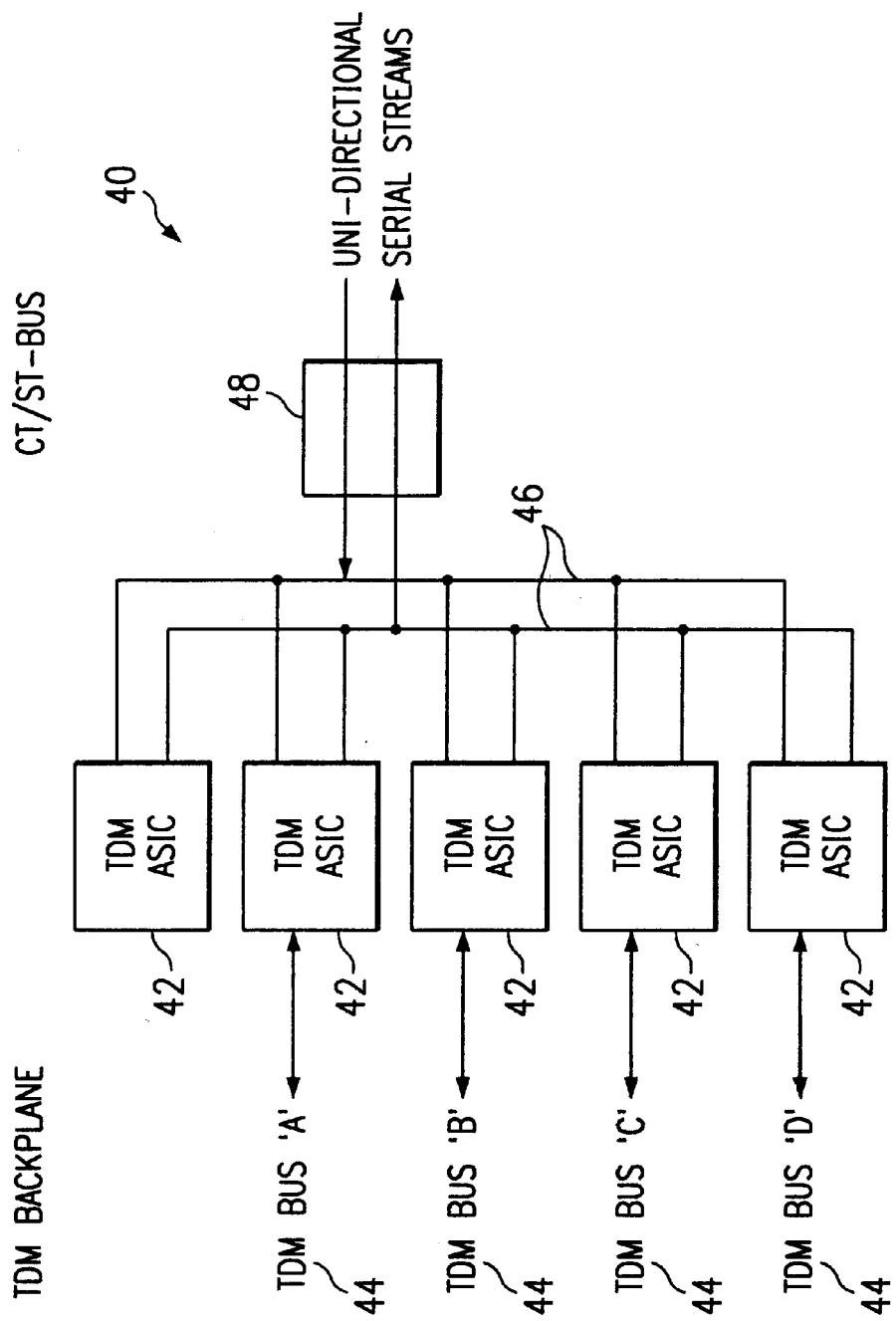
FIG. 2 illustrates an example ASIC complex 40 includes multiple TDM ASIC devices.

FIG. 2 illustrates an example ASIC complex 40 within a particular service provider 14 that includes five TDM ASIC devices 42. In a particular embodiment, where switching unit 10 supports 16,384 ports, four TDM ASIC devices 42 each switch digital data associated with 4,096 ports. Each ASIC device 42 communicates data between an associated TDM bus 44 of backplane 16 and a shared card level serial bus, which may be based on the Computer Telephony (CT) bus structure as specified in the Enterprise Computer Telephony Forum (ECTF) H.110 standard, a MITEL Serial Telephony (ST) bus structure, or any other suitable bus structure. This serial bus is referred to herein as CT/ST bus 46. CT/ST bus 46 couples ASIC complex 40 to I/O module 30 associated with service provider 14 or other service functions including but not limited to a digital signal processing (DSP) device located on service provider 14. In general, ASIC devices 42 will receive uni-directional, bi-directional, or other serial data streams from CT/ST bus 46, switch incoming data for each CT/ST bus time slot to a selected TDM bus time slot according to input from CPU 36, and transmit the switched data to TDM buses 44 and backplane 16. Moving in the opposite direction, ASIC devices 42 will receive the outgoing data from TDM buses 44, switch the outgoing data for each TDM bus time slot to a selected CT/ST bus time slot according to input from CPU 36, and transmit the switched data in the form of uni-directional, bi-directional, or other serial data streams to CT/ST bus 46.

In a particular embodiment, each TDM bus 44 is a bi-directional 8 bit bus that supports a specified range of 4,096 multiplexed time slots within a TDM bus frame and CT/ST bus 46 is a 32 bit bus supporting up to 2,048 channels using 2,048 multiplexed time slots within a CT/ST bus frame, although the present invention contemplates TDM buses 44 and CT/ST bus 46 supporting any suitable number of channels and time slots. For example, where a particular network interface associated with ASIC device 42 is a T1 interface supporting twenty-four channels, twenty-four CT/ST bus time slots within CT/ST and TDM bus frames may be needed to handle call traffic associated with the T1 interface. However, where a particular network interface associated with ASIC device 42 is an OC-3 interface supporting 2,048 channels, 2,048 CT/ST bus time slots within CT/ST and TDM bus frames may be needed to handle call traffic associated with that OC-3 interface. Therefore, where TDM bus 44 supports up to 4,096 channels using 4,096 time slots per TDM bus frame, CT/ST bus 46 may support up to 4,096 channels using 4,096 time slots per CT/ST bus frame. Those skilled in the art will appreciate that these parameters are merely example and are not intended to limit the scope of the present invention.

In a particular embodiment, the fifth TDM ASIC device 42 provides a loopback path to ports associated with the same service provider 14, allowing service provider 14 to switch data between such ports without undesirably consuming backplane resources. This ASIC device 42 may further allow a DSP or other suitable processing device 48 to be associated with one or more suitable signaling interfaces, as an example only and without limitation, for providing voice over IP (VoIP) switching. In one embodiment, DSP device 48 couples to CT/ST bus 46 and processes incoming data from CT/ST bus 46, outgoing data to CT/ST bus 46, or both incoming and outgoing data. Although ASIC complex 40 is described as including five TDM ASIC devices 42, the present invention contemplates scaling ASIC complex 40 to incorporate more or fewer ASIC devices 42, according to particular needs. As an example, if service provider 14 does not include DSP device 48 or does not include a loopback path for switching data between ports associated with the same service provider 14, ASIC complex 40 may include just four ASIC devices 42. Similarly, where switching unit 10 is associated with more or fewer than 16,384 ports, or where each ASIC device 42 in ASIC complex 40 supports more or fewer than 4,096 of 16,384 total ports, the number of ASIC devices 42 in ASIC complex 40 may reflect this.

An ASIC device 42 that is suitable to switch incoming data for communication to one or more outgoing network interfaces associated with other service providers 14 in switching unit 10 may be referred to as an externally switching ASIC device 42. An ASIC device 42 suitable to switch incoming data for communication to one or more outgoing network interfaces associated with the same service provider 14 that supports ASIC device 42 may be referred to as an internally switching ASIC device 42. While externally and internally switching ASIC devices 42 are discussed as having different capabilities, the present invention contemplates one or more ASIC devices 42 suitable to operate as externally switching ASIC devices 42, internally switching ASIC devices 42, or both externally and internally switching ASIC devices 42. Providing an ASIC complex 40 supporting multiple externally switching ASIC devices 42 together with at least one internally switching ASIC device 42 to perform TDM switching on service provider 14 or another suitable interface card is an important technical advantage of the present invention.

To help prevent single points of failure from propagating and help satisfy high availability requirements, ASIC devices 42 may be cascaded or otherwise arranged such that a fault associated with a particular ASIC device 42 results in loss of data integrity only for those time slots associated with the particular ASIC device 42. For example, where service provider 14 supports 16,384 time slots and each ASIC device 42 supports a specified range of 4,096 time slots, failure of a single ASIC device 42 may result in twenty-five percent diminished capacity for service provider 14 but will not result in complete unavailability of service provider 14 for switching data associated with the other 12,288 time slots. Moreover, in response to the failure, service provider 14 may be electrically isolated from other cards in switching unit 10 using isolate bus 24 in the manner described more fully in copending U.S. Pat. No. 6,434,703. As a result of these and other features, ASIC complex 40 is well suited for incorporation into the high availability backplane environment of switching unit 10. As described more fully below, each ASIC device 42 provides highly accurate TDM switching capability with increased speed, efficiency, and reliability, fewer components, reduced footprint, lower manufacturing cost, and lower power consumption relative to prior TDM switching techniques involving a larger number of discrete devices.

Figure 3:
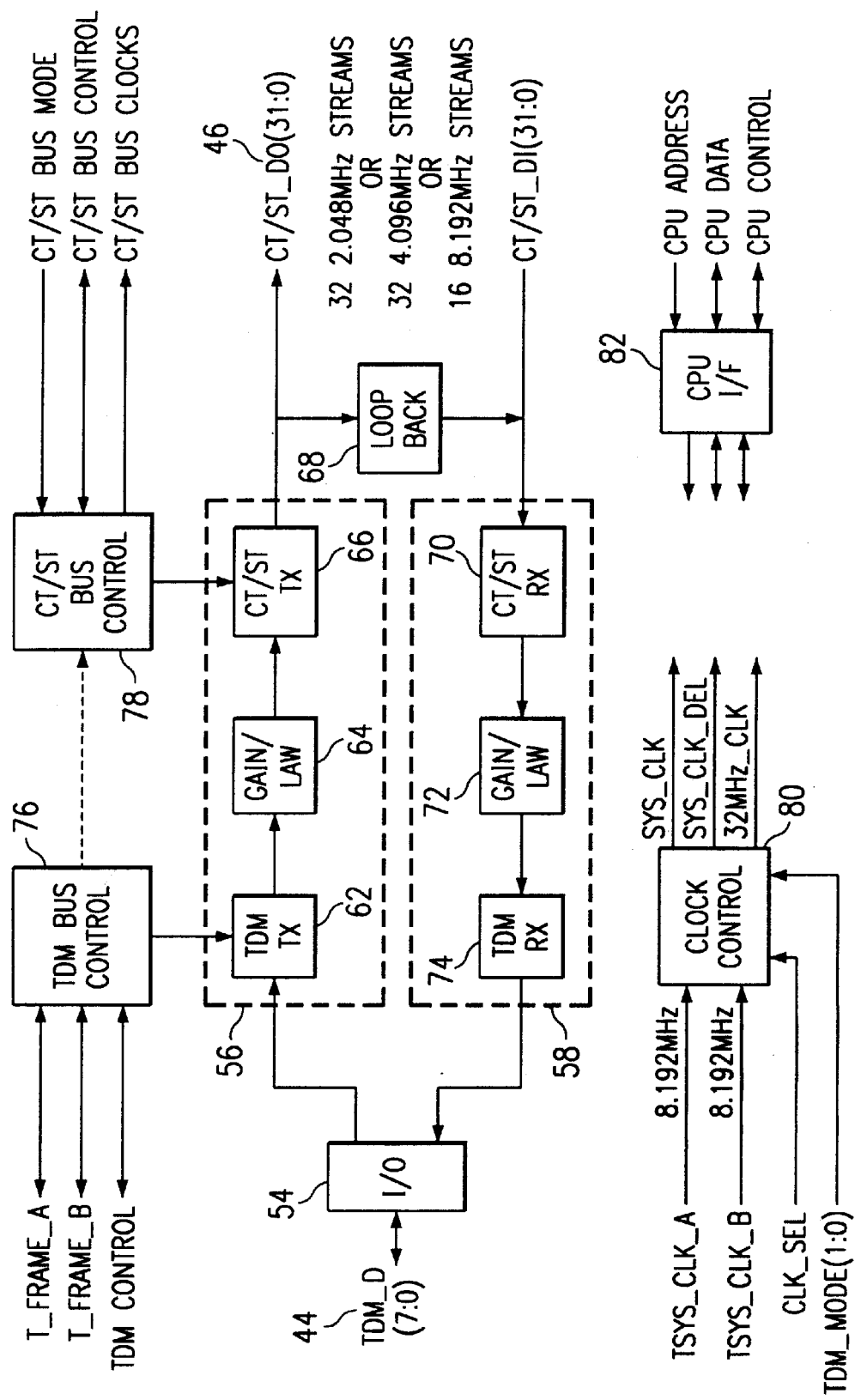
FIG. 3 illustrates example components of a particular TDM ASIC device.

FIG. 3 illustrates example components of a particular TDM ASIC device 42 within service provider 14. In general, transmit data path 56 switches outgoing data (TDM$_{13}$ D(7:0)) received from associated TDM bus 44 for communication to CT/ST bus 46 as unidirectional serial streams (CT/ST$_{13}$ DO(31:0)). In a particular embodiment, the inbound data rate from TDM bus 44 may be approximately 32.768 MHz, 24.576 MHz, or 16.384 MHz depending on a selected TDM bus operating mode. CT/ST bus 46 may communicate thirty-two streams at an outbound data rate of approximately 4.096 MHz or 2.048 MHz, sixteen streams at approximately 8.192 MHz, or any other appropriate streams, depending on a selected CT/ST bus operating mode. Using transmit data path 56, ASIC device 42 switches and otherwise processes outgoing data destined for some or all available CT/ST bus time slots to these CT/ST bus time slots according to input from CPU 36.

Transmit data path 56 includes transmit (TX) TDM section 62 that receives data from an input/output (I/O) buffer 54, switches the data as instructed, and communicates the data to transmit gain/law section 64. Gain/law section 64 receives data from TDM section 62, provides gain/law conversion for the data in accordance with a statically programmed look-up table of the present invention, and then communicates the data to transmit CT/ST section 66. CT/ST section 66 receives data from gain/law section 64, stores the data sequentially in a suitable number of holding registers, loads associated parallel to serial converters, and communicates serial data streams to CT/ST bus 46. Loopback path 68 provides loopback of one or more programmable outbound data streams to replace one or more selected inbound data streams for testing and other diagnostic purposes. TDM section 62, gain/law section 64, and CT/ST section 66 of transmit data path 56 are described more fully below with reference to FIGS. 4, 5, and 6, respectively.

In general, receive data path 58 switches the incoming data (CT/ST$_{13}$ DI(31:0)) received from CT/ST bus 46 as uni-directional serial streams for communication to the associated TDM bus 44. In a particular embodiment, inbound data may be received as thirty-two streams at a rate of approximately 4.096 MHz or 2.048 MHz, sixteen streams at approximately 8.192 MHz, or any other suitable streams, depending on the selected CT/ST bus operating mode. Outbound data may be communicated to TDM bus 44 at approximately 32.768 MHz, 24.576 MHz, or 16.384 MHz, depending on the selected TDM bus operating mode. Using receive data path 58, ASIC device 42 switches and otherwise process data for some or all incoming CT/ST bus time slots to the appropriate TDM bus time slots according to instructions from CPU 36.

Receive data path 58 includes receive (RX) CT/ST section 70 that receives incoming data from CT/ST bus 46, loads the data in an appropriate number of serial to parallel converters, stores the data in corresponding holding registers, and sequentially communicates it to receive gain/law section 72. Gain/law section 72 receives the data from CT/ST section 70, provides gain/law conversion for the data in accordance with a statically programmed look-up table, and then communicates the data to receive TDM section 74. TDM section 74 receives data from gain/law section 72, switches the data as appropriate, and communicates the data to I/O buffer 54, associated TDM bus 44, and TDM backplane 16. CT/ST section 70, gain/law section 72, and TDM section 74 of receive path 58 are described more fully below with reference to FIGS. 6, 7, and 8, respectively.

ASIC device 42 includes a TDM bus control section 76 that in general provides control functionality allowing ASIC device 42 to interface with backplane 16. In one embodiment, TDM bus control section 76 provides at least frame synchronization and associated fault protection functionality described in copending U.S. application Ser. No. 09/328,031. A frame of data includes data for each of a specified number of time slots each corresponding in one embodiment to a port associated with switching unit 10. As an example, although the present invention contemplates any appropriate frame length and any appropriate number of TDM bus time slots within each TDM bus frame, in a particular embodiment in which switching unit 10 supports 16,384 ports, each 125 μs TDM bus frame may include 4,096, 3,072, or 2,048 time slots according to a selected TDM bus operating mode. In one embodiment, a full TDM bus frame carries data for each available TDM bus time slot, 4,096 data words corresponding to 4,096 TDM bus time slots for example. Each TDM bus frame may carry data for each of the 4,096 TDM bus time slots even where CT/ST bus 46 is supporting fewer than 2,048 channels and each CT/ST bus frame carries data for fewer than 2,048 CT/ST bus time slots. As discussed above, these parameters and example only and should not be understood to limit the scope of the present invention.

CT/ST bus control section 78 in general provides control functionality allowing ASIC device 42 to interface with CT/ST bus 46. CT/ST bus control section 78 may receive input from and operate at least in part subject to control of TDM bus control section 76. For example, CT/ST bus control section 78 may use frame pulses received from TDM bus control section 76 to generate frame pulses associated with CT/ST bus 46. In one embodiment, frame pulses for CT/ST bus control section 78 are offset from frame pulses for TDM bus control section 76 by the number of clock cycles required for data to propagate through transmit data path 56 to CT/ST bus 46. In one embodiment, although the present invention contemplates any appropriate frame length and any appropriate number of CT/ST bus time slots in each CT/ST bus frame, in a particular embodiment in which switching unit 10 supports 16,384 ports, each 125 μs CT/ST bus frame may include 2,048 or 1,024 time slots according to a selected CT/ST bus operating mode. As discussed above, where CT/ST bus 46 supports more ports than are being used, fewer than 2,048 or 1,024 CT/ST time slots may have associated data.

ASIC device 42 includes a clock control section 80 that provides suitable clock synchronization and associated fault protection functionality as described in copending U.S. application Ser. No. 09/330,433. In particular, among its other activities, clock control section 80 is responsible for providing a system clock signal for use with respect to its internal switching operations. ASIC device 42 further includes a CPU interface section 82 providing a general purpose interface to CPU 36 and its associated software. CPU interface 82 includes one or more control status registers allowing CPU 36 to configure various aspects of ASIC device 42, initialize ASIC device 42, and receive fault, status, and other indications from ASIC device 42. The present invention contemplates ASIC device 42 including additional logic, circuitry, and other appropriate functionality for cooperating with, providing input to, and receiving input from appropriate components of transmit data path 56, receive data path 58, and any other components of service provider 14 during operation of ASIC device 42.

Figure 4:
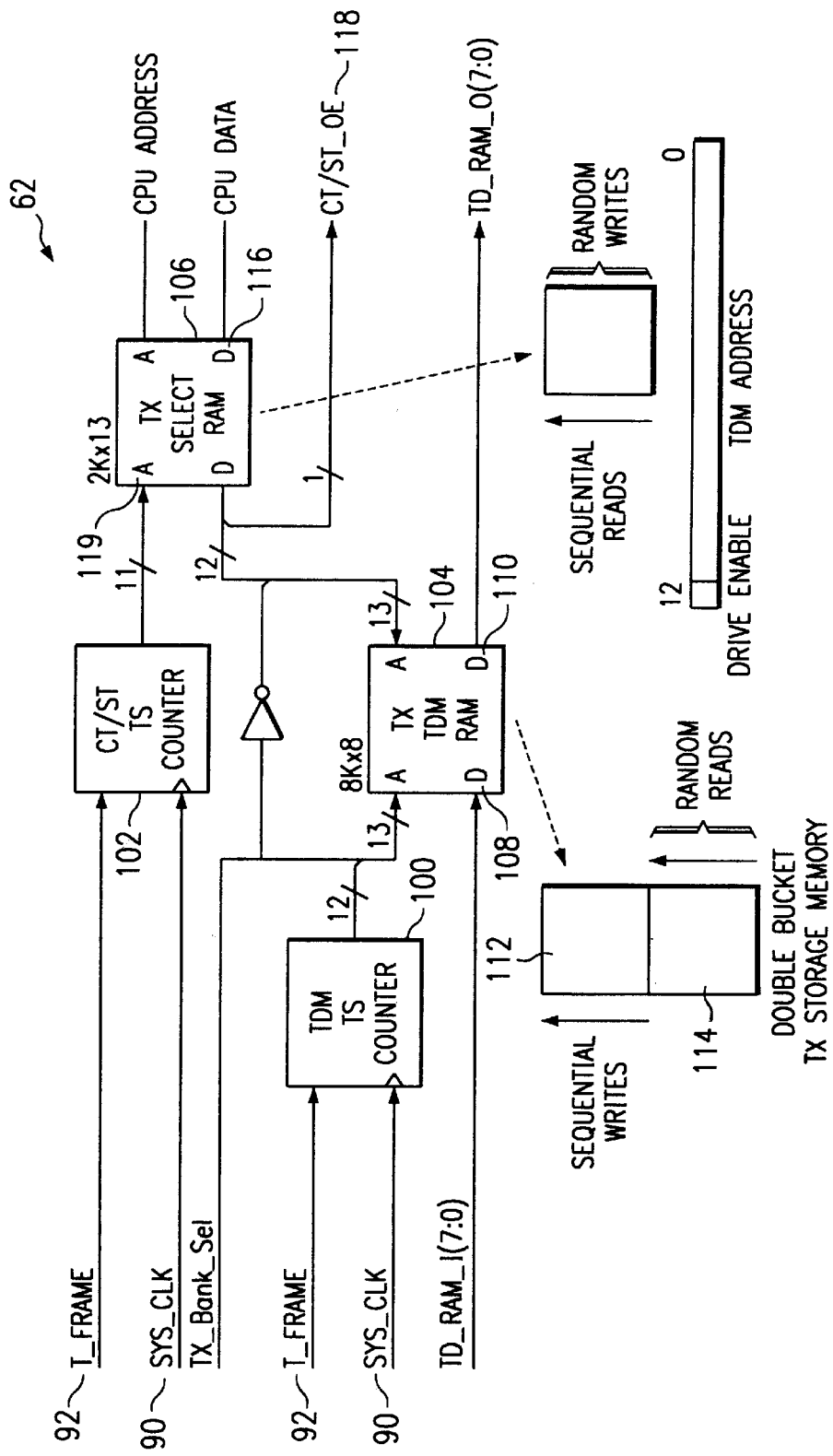
FIG. 4 illustrates example components in a transmit TDM section of a transmit data path.

FIG. 4 illustrates example components within transmit TDM section 62, which principally include TDM time slot (TS) counter 100, CT/ST time slot counter 102, transmit TDM random access memory (RAM) 104, and transmit select RAM 106. TDM time slot counter 100 receives system clock signal 90 from clock control section 80 and frame pulses 92 from TDM control section 76, counts according to system clock signal 90 to maintain a current TDM bus time slot location within each frame being processed, and clears to time slot "0" in response to each frame pulse 92 received. Counter 100 directly addresses TDM RAM 104 and maintains a sequential write order to TDM RAM relative to sequential time slots within the TDM bus frame. As described below with reference to FIG. 9, TDM RAM 104 may share counter 100 with a receive TDM RAM within receive TDM section 74. CT/ST time slot counter 102 receives system clock signal 90 from clock control section 80 and frame pulses 92 from TDM control section 76, counts according to system clock signal 90 to maintain a current CT/ST bus time slot location in each frame being processed, and clears to time slot "0" in response to each frame pulse 92 received. Counter 102 directly addresses select RAM 106. As described below with reference to FIG. 9, select RAM 106 may share counter 102 with a receive select RAM within receive TDM section 74. Any suitable counters may be used according to particular needs.

In one embodiment, transmit TDM RAM 104 is an 8K×8 dual ported RAM having one write side and one read side. Data for each outgoing TDM bus time slot ($TD_{13}$ $RAM_{13}$ I(7:0)) is sequentially written to write port 108, stored, and "switched" to an appropriate CT/ST bus time slot according to the manner in which the data is read from read port 110. In one embodiment, data is read from TDM RAM 104 based on input from select RAM 106. Data for any TDM bus time slot may be switched or otherwise associated with any CT/ST bus time slot. Once it has been read, the switched data is communicated from TDM RAM 104 to transmit gain/law section 64. In a particular embodiment, the maximum data rate to write port 108 is approximately 32.768 MHz to support 4,096 time slots per 125 μs TDM bus frame, and the maximum data rate from read port 110 is approximately 16.384 MHz to support 2,048 time slots per 125 μs CT/ST bus frame.

As shown in FIG. 4, TDM RAM 104 provides a "double bucket" approach, with sequential writes occurring to a first bucket or other portion 112 of TDM RAM 104 for a complete current TDM bus frame while "random" reads occur, according to input from select RAM 106, from a second bucket or other portion 114 of TDM RAM 104 for the previous TDM bus frame. To preserve data integrity and avoid simultaneous write and read access to a single storage location, writes and reads alternate between buckets 112 and 114. For example, sequential writes for a second TDM bus frame occur to first bucket 112 while random reads of data for a first TDM bus frame occur from second bucket 114. When first bucket 112 has been fully written with the data for the second TDM bus frame, and the data for the first TDM bus frame has been fully read from second bucket 114, then sequential writes for a third TDM bus frame begin to second bucket 114 while random reads of data for the second TDM bus frame begin from first bucket 112. This double bucket approach helps ensure that data being read from either bucket 112 or 114 is reliable in that the same bucket 112 or 114 is not simultaneously being written.

Transmit select RAM 106 provides addressing for the read side of TDM RAM 104. This input determines, for each successive CT/ST bus time slot, the stored data to be "switched" or otherwise associated with that CT/ST bus time slot and communicated to transmit gain/law section 64. In one embodiment, select RAM 106 is a 2K×13 dual ported RAM with one write/read side and one read only side. The input data rate to write/read port 116 from CPU 36 may be variable and is determined according to the operation of CPU 36. In one embodiment, at initialization of ASIC device 42, select RAM 106 receives a 13 bit word from CPU 36 at write/read port 116 and stores the word in a location appropriate to specify, upon addressing TDM RAM 104, the data to be communicated from read port 110 for each CT/ST bus time slot. Within the 13 bit word, a 12 bit address field is used to select from TDM RAM 104 the stored data that is to be switched to the CT/ST bus time slot. These twelve bits directly address the data in buckets 112 and 114. A 1 bit CT/ST output enable ($CT/ST_{13}$ OE) 118 enables the CT/ST bus driver for the CT/ST bus time slot and is passed with the CT/ST bus data through appropriate portions of transmit data path 56. Counter 102 sequentially addresses read only port 119 of select RAM 106, most significant bit (MSB) first or in another suitable manner. In one embodiment, writing to select RAM 106 occurs only during call setup and call teardown and, therefore, simultaneous writing and reading of select RAM 106 may occur only during call setup and call teardown. Since this should not compromise call data integrity, it is not an issue of concern from a system perspective.

Figure 5:
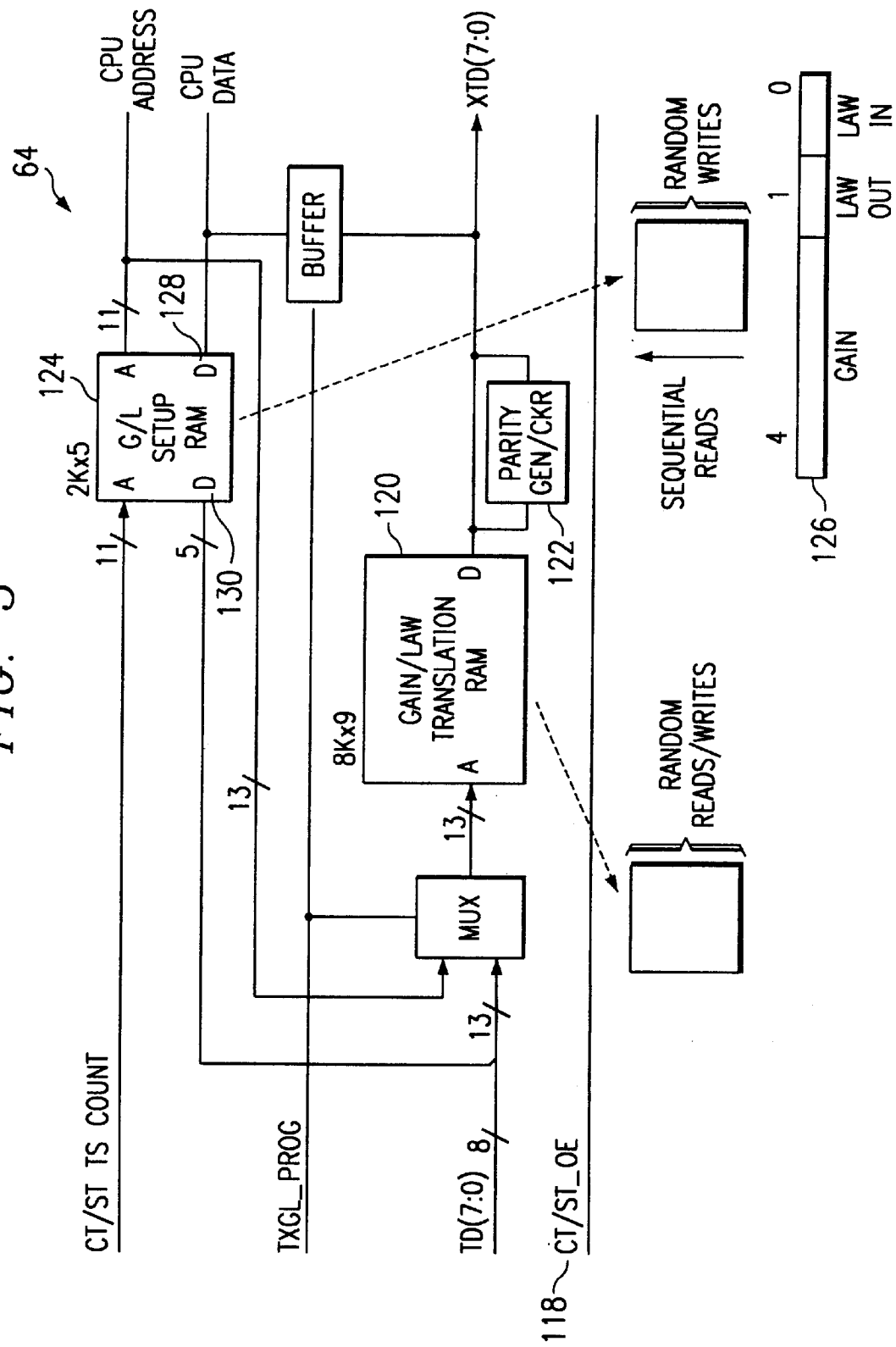
FIG. 5 illustrates example components in a transmit gain/law section of a transmit data path.

FIG. 5 illustrates example components of transmit gain/law section 64, which in general provides gain/law conversion for switched data received from TDM section 62 according to a statically programmed look-up table of the present invention. Gain may be positive, negative, or zero and law conversion may include A-law, μ-law, or any other appropriate law conversion. Principal components of gain/law section 64 include gain/law translation RAM 120, parity generator/checker 122, and gain/law setup RAM 124.

In one embodiment, translation RAM 120 is an 8K×9 single ported RAM used for providing gain/law conversion for the 8 bit data field (TD(7:0)) received from TDM RAM 104. Gain/law translation RAM 120 is programmed statically on initialization of ASIC device 42 through CPU interface 82 and may contain the same information as long as ASIC device 42 remains in operation, for example only and not by way of limitation, one or more years depending upon the application. Translation RAM 120 stores a look-up table containing 8,192 or any other appropriate number of gain/law conversions that are available for manipulating the data received from TDM RAM 104. A 5 bit or other appropriate gain/law code 126 for each time slot is read from read port 130 of gain/law setup RAM 124, MSB first or otherwise, and combined with the corresponding 8 bit data field from TDM RAM 104 for the time slot. Translation RAM 120 is addressed using the resulting 13 bit combined field and the 8 bit data field is then manipulated according to the specified one of the gain/law conversions in translation RAM 120. For each time slot, channel, or call, gain/law code 126 specifies which of these gain/law conversions that translation RAM 120 should apply to the data for that time slot, channel, or call to generate modified data for that time slot, channel, or call.

In one embodiment, the first bit of 5 bit gain/law code 126 is used to specify an incoming A-law or $\mu$-law conversion, the second bit may be used to specify an outgoing A-law or $\mu$-law conversion, and the final three bits are collectively used to specify one of eight possible gain levels (since each of the three bits may have either a "0" or a "1" value). The 8 bit data field from transmit TDM RAM 104, read out least significant bit (LSB) first in one embodiment, is combined with the 5 bit gain/law code 126 and then manipulated at translation RAM 120 according to the specified gain/law conversion the combined 13 bit field addresses for the corresponding time slot. Since each bit of the combined 13 bit field may have either a "0" or a "1" value, a total of 8,192 addresses are available and thus 8,192 gain/law conversions may be stored in translation RAM 120. Since for each 8 bit data field eight of the thirteen address bits are fixed, leaving the five bits of gain/law code 126 as variable for the given 8 bit data field, thirty-two gain/law conversions are available for each 8 bit data field read from TDM RAM 104 in this particular embodiment. Since any one of thirty-two 5 bit gain/law codes 126 may be combined with each possible 8 bit data field, translation RAM 120 contains a total of 256×32 or 8,192 available gain/law conversions.

Although an 8 bit data field and a 5 bit gain/law code 126 combining to produce a 13 bit address that specifies one of 8,192 available gain/law conversions is discussed, the present invention contemplates specifying one of any suitable number of gain/law conversions. For example, translation RAM 120 might be programmed to store 16,384 available gain/law conversions and setup RAM 124 might communicate 6 bit gain/law code 126 for each time slot to combine with the 8 bit data field to address translation RAM 120 and thereby specify a particular gain/law conversion for the data for that particular time slot. Moreover, although gain/law conversions and gain/law codes are principally discussed, the present invention contemplates translation RAM 120 storing any suitable data processing options and setup RAM 124 communicating any suitable code 126 to combine with the data for an associated time slot to specify a particular option for that time slot. The present invention contemplates any suitable conversions and associated codes 126, both in number and in type, for processing the data received from TDM RAM 104.

In one embodiment, parity generator/checker 122 generates a single parity bit on each write to translation RAM 120 and stores the parity bit in translation RAM 120 in association with corresponding gain/law conversion information.

The 8 bit data field from TDM RAM 104 is modified according to the specified gain/law conversion, the parity bit is associated with the 8 bit modified data field in translation RAM 120, and a resulting 9 bit field is read from translation RAM 120. Parity generator/checker 122 evaluates the 9 bit field to determine whether parity is valid and notifies CPU 36 if the parity is invalid. The 8 bit modified data field (XTD(7:0)) may be allowed to proceed through transmit data path 56 whether or not parity is valid.

Input and output data rates for translation RAM 120 may depend on the selected CT/ST bus operating mode and in one embodiment are a maximum of approximately 16.384 MHz to support 2,048 CT/ST bus time slots. Reads may occur from translation RAM 104 in thirty-two word bursts, sixteen word bursts, or any other suitable manner depending on the number of CT/ST bus channels used. Data from these burst reads is sequentially loaded into holding registers associated with CT/ST section 66. Reads suspend until the contents of the registers are loaded into parallel to serial converters of transmit CT/ST section 66 for communication to CT/ST bus 46. CT/ST output enable bit 118 may bypass gain/law conversion section 64 to remain synchronous with the data transmitted through transmit data path 56.

In one embodiment, gain/law setup RAM 124 is a 2K×5 dual ported RAM with one write/read side and one read only side, similar to transmit select RAM 106. As described above, gain/law setup RAM 124 contains 5 bit gain/law or any other suitable codes 126 that specify gain/law conversion or any other suitable manipulation for data for each time slot, channel, or call. Providing dynamically programmable gain/law or other codes 126 for the statically programmed look-up table of translation RAM 120 to specify gain/law or other data conversion on a per time slot, per channel, or per call basis is an important technical advantages of the present invention. CPU port 128 of setup RAM 124 supports both writes and reads, while gain/law code transmit port 130 supports reads only. CT/ST time slot counter 102 directly addresses the read only side of setup RAM 124 using eleven bits, received MSB first or otherwise, that maintain sequence with the outgoing data for the CT/ST bus time slots. In one embodiment, writing to gain/law setup RAM 124 occurs only during call setup and call teardown and, therefore, simultaneous writing to and reading of gain/law setup RAM 124 may occur only during call setup and call teardown. Since this should not compromise call data integrity, it is not an issue of concern from a system perspective.

FIG. 6 illustrates example components of transmit CT/ST section 66 within transmit data path 56. CT/ST section 66 receives data from transmit gain/law section 64 and stores this data sequentially in holding registers 140. In the particular embodiment in which ASIC device 42 supports 4,096 time slots, CT/ST section 66 may include thirty-two holding registers 140, although any suitable number of holding registers 140 may be used. All holding registers 140 simultaneously load corresponding parallel to serial converters 142, which convert the data from parallel to serial streams and serially shift out the data ($CT/ST_{13}$ D(n), n=0,1, . . . 31) one bit at a time, MSB first or otherwise, at the programmed outgoing data rate onto CT/ST bus 46. The CT/ST bus interface may be configured to invert or otherwise suitably manipulate data to time slot relationships such that the data is shifted out LSB first rather than MSB first. While the data for the current CT/ST bus time slot is being shifted out of converters 142 to CT/ST bus 46, data for the next CT/ST bus time slot is being sequentially loaded into holding registers 140 until communication of the data for the current CT/ST bus time slot from converters 142 is complete. CT/ST output enable bit 118 is passed with the data and enables the CT/ST bus driver for the corresponding CT/ST bus time slot.

FIG. 7 illustrates example components of receive CT/ST section 70 in receive data path 58. CT/ST section 70 receives incoming data (CT/ST$_{13}$ D(n), n=0,1, . . . 31) from CT/ST bus 46 and converts the data from serial to parallel streams using serial to parallel converters 146. In a particular embodiment in which ASIC device 42 supports 4,096 time slots, CT/ST section 70 may include thirty-two serial to parallel converters 146, although any suitable number of converters 146 may be used. ASIC device 42 shifts in the data for each CT/ST bus time slot, MSB first or otherwise, at the programmed CT/ST bus input data rate. The CT/ST bus interface may be configured to invert or otherwise suitably modify data to time slot relationships such that the data is shifted in LSB first rather than MSB first. The incoming data is stored synchronously in corresponding holding registers 148, one holding register 148 for each data stream, sequentially read out of holding registers 148, and communicated to receive gain/law section 72.

Figure 8:
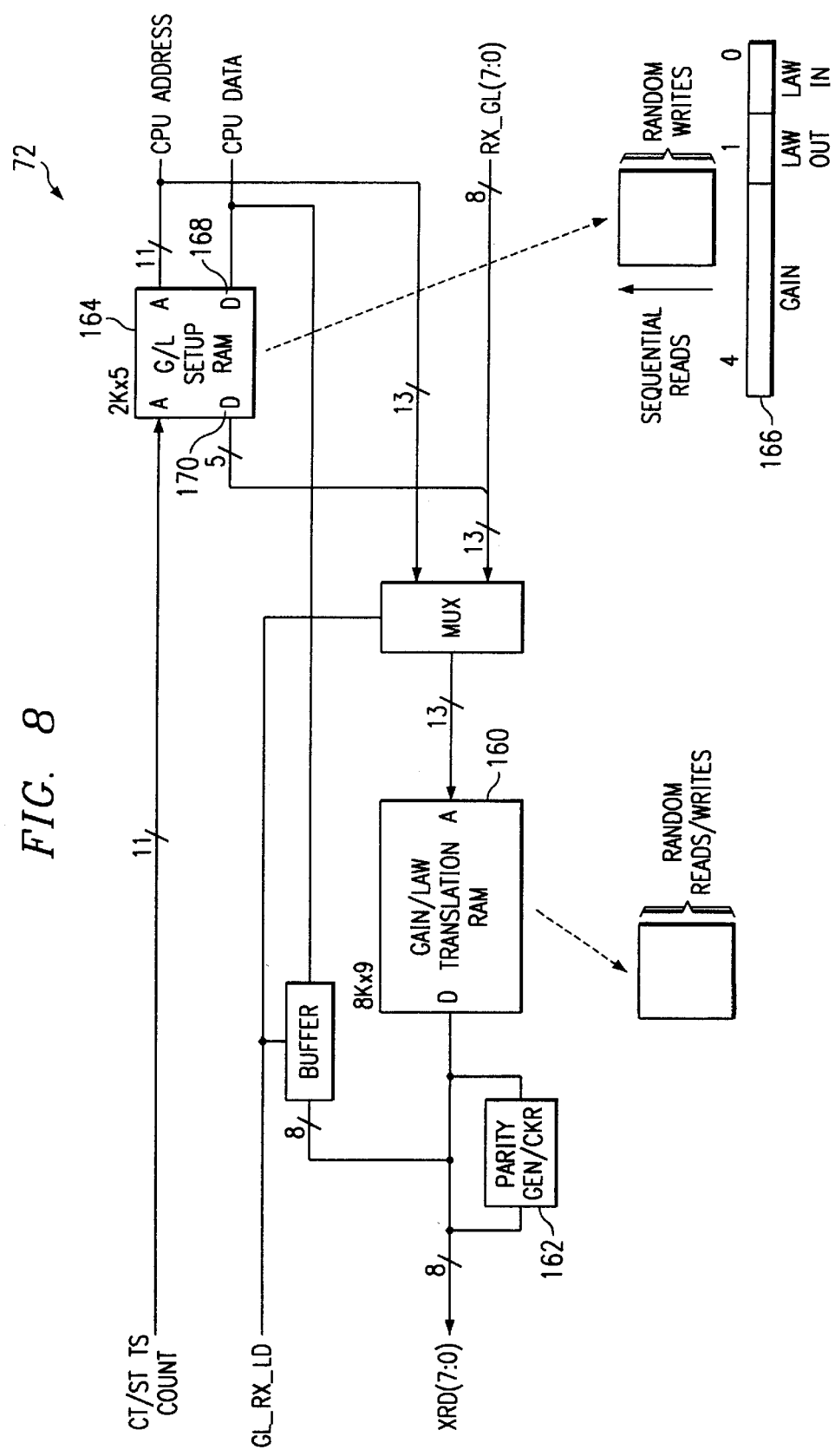
FIG. 8 illustrates example components in a receive gain/law section of a receive data path.

FIG. 8 illustrates example components of receive gain/law section 72, which in general provides suitable gain/law conversion for data received from receive CT/ST section 70 according to a statically programmed look-up table of the present invention, analogous to the operation of transmit gain/law section 64 described above. Gain may be positive, negative, or zero and law conversion may include A-law, μ-law, or any other suitable law conversion. Primary components of receive gain/law section 72 include gain/law translation RAM 160, parity generator/checker 162, and gain/law setup RAM 164.

In one embodiment, translation RAM 160 is an 8K×9 single ported RAM that is used to provide gain/law conversion for the 8 bit data field (RX$_{13}$ GL(7:0)) received from CT/ST section 70. Gain/law translation RAM 160 is programmed statically during the initialization of ASIC device 42 through CPU interface 82 and may contain the same information as long as ASIC device 42 remains in operation, for example only and without limitation, one or more years depending on the application. Translation RAM 160 stores a look-up table containing 8,192 or any other suitable number of gain/law conversions that are available for manipulating data received from CT/ST section 70. A 5 bit or other appropriate gain/law code 166 is communicated, MSB first or otherwise, from read port 170 of gain/law setup RAM 164 and combined with the corresponding 8 bit data field received from CT/ST section 70 for the time slot. Translation RAM 160 is addressed using the resulting 13 bit combined field and the 8 bit data field is then manipulated according to the specified one of the gain/law conversions in translation RAM 160. For each time slot, channel, or call, gain/law code 166 specifies which of these gain/law conversions translation RAM 160 should apply to the data for that time slot, channel, or call.

In one embodiment, the first bit of 5 bit gain/law code 166 is used to specify an incoming A-law or μ-law conversion, the second bit may be used to specify an outgoing A-law or μlaw conversion, and the final three bits are collectively used to specify one of eight possible gain levels (since each of the three bits may have either a "0" or a "1" value). The 8 bit data field from CT/ST section 70 is combined with the bit gain/law code 166 and manipulated at translation RAM 160 according to the specified gain/law conversion the combined 13 bit field addresses for the corresponding time slot. Since each bit of the combined 13 bit field may have either a "0" or a "1" value, a total of 8,192 addresses are available and thus 8,192 gain/law conversions may be stored in translation RAM 160. Since for each 8 bit data field eight of the thirteen address bits are fixed, leaving only the five bits of gain/law code 166 as variable for the given 8 bit data field, thirty-two gain/law conversions are available for each 8 bit data field received from CT/ST section 170 in this particular embodiment. Since any of thirty-two 5 bit gain/law codes 126 may be combined with each possible 8 bit data field, translation RAM 160 contains a total of 256×32 or 8,192 available gain/law conversions.

Although an 8 bit data field and a 5 bit gain/law code 166 combining to produce a 13 bit address that specifies one of 8,192 available gain/law conversions is discussed, the present invention contemplates specifying one of any suitable number of gain/law conversions. For example, translation RAM 160 might be programmed to store 16,384 available gain/law conversions and setup RAM 164 might communicate 6 bit gain/law code 166 for each time slot to combine with the 8 bit data field to address translation RAM 160 and thereby specify a particular gain/law conversion for the data for that particular time slot. Moreover, although gain/law conversions and gain/law codes are principally discussed, the present invention contemplates translation RAM 160 storing any suitable data processing options and setup RAM 164 communicating any suitable code 166 to combine with the data for an associated time slot to specify a particular option for that time slot. The present invention contemplates any suitable conversions and associated codes 166, both in number and in type, for processing the data received from CT/ST section 70.

In one embodiment, similar to parity generator/checker 122 of transmit gain/law section 64, parity generator/checker 162 generates a single parity bit on each write to translation RAM 160 and additionally stores the parity bit in translation RAM 160 in association with the corresponding gain/law conversion information. The 8 bit data field from CT/ST section 70 is modified according to the specified gain/law conversion, the parity bit is associated with the 8 bit modified data field in translation RAM 160, and a resulting 9 bit field is read from translation RAM 160. Parity generator/checker 162 evaluates the 9 bit field to determine whether parity is valid and notifies CPU 36 if the parity is invalid. The 8 bit modified data field (XRD(7:0)) may be allowed to proceed through receive data path 58 whether or not parity is valid.

Input and output data rates for translation RAM 160 may depend on the selected CT/ST bus operating mode and in one embodiment are a maximum of approximately 16.384 MHz to support 2,048 CT/ST bus time slots, although the present invention contemplates any appropriate input and output data rates according to particular needs.

In one embodiment, similar to transmit gain/law setup RAM 124, gain/law setup RAM 164 is a 2K×5 dual ported RAM with one write/read side and one read only side. As described above, gain/law setup RAM 164 contains 5 bit gain/law or any other suitable codes 166 that specify gain/law conversion of any other suitable manipulation for data for each time slot, channel, or call. Providing dynamically programmable gain/law or other codes 166 for the statically programmed look-up table of translation RAM 160 to specify gain/law or other data conversion on a per time slot, per channel, or per call basis is an important technical advantage of the present invention. CPU port 168 of setup RAM 164 supports writes and reads, while gain/law code transmit port 170 supports reads only. CT/ST time slot counter 102 directly addresses the read only side of setup RAM 164 using eleven bits, received MSB first or otherwise, that maintain sequence with the incoming data for the CT/ST bus time slots. In one embodiment, writing to gain/law setup RAM 164 occurs only during call setup and call teardown and, therefore, simultaneous writing to and reading of gain/law setup RAM 164 may occur only during call setup and call teardown. Since this should not compromise call data integrity, it is not an issue of concern from a system perspective.

Figure 9:
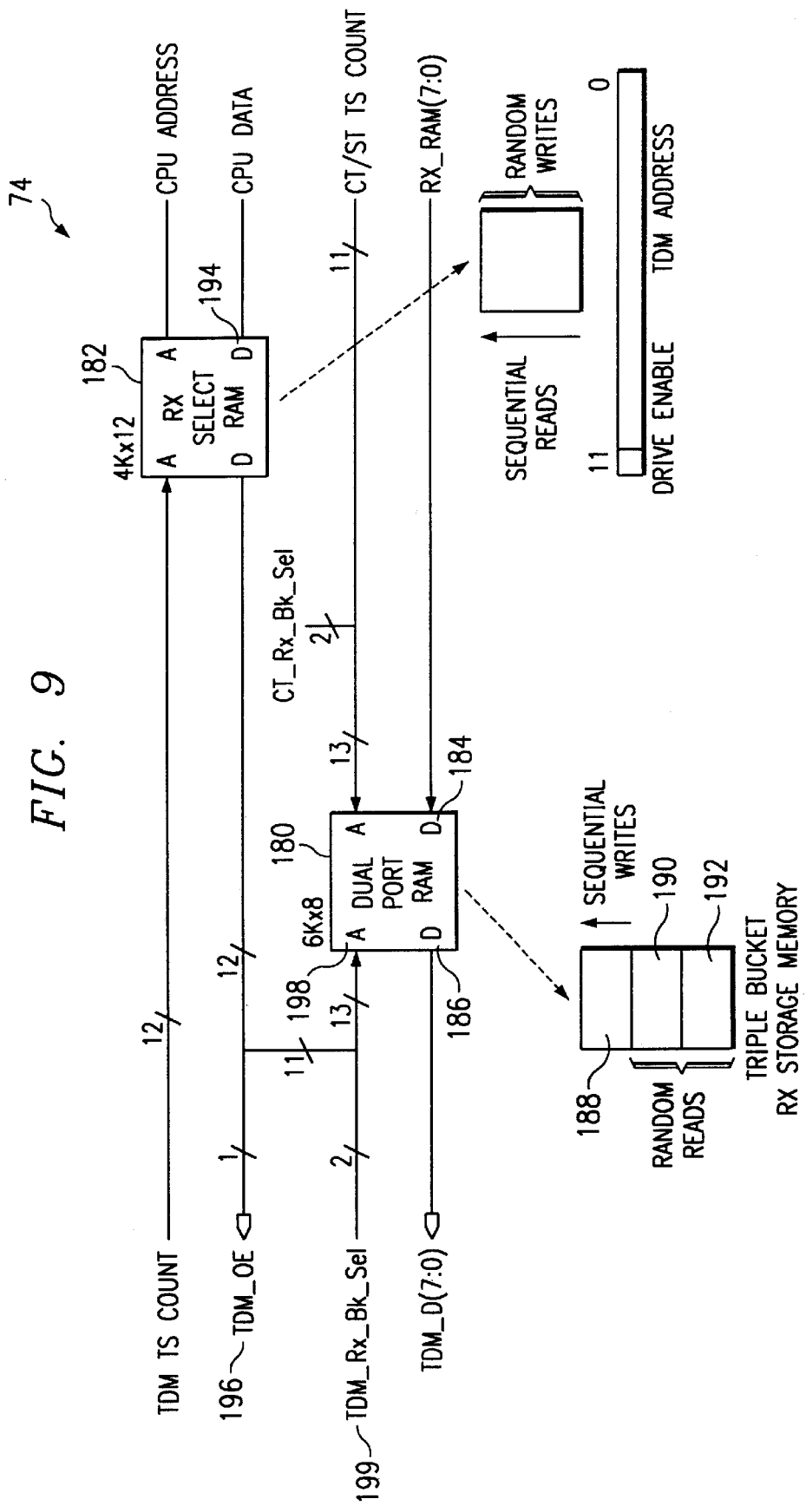
FIG. 9 illustrates example components in a receive TDM section of a receive data path.

FIG. 9 illustrates example components within TDM receive section 74, which principally include a receive TDM RAM 180 and a receive select RAM 182. In one embodiment, suitable components of TDM receive section 74 share TDM time slot counter 100 and CT/ST time slot counter 102 with analogous components in transmit TDM section 62. CT/ST counter 102 directly addresses TDM RAM 180, maintaining a sequential write order relative to sequential time slots in the CT/ST bus frame, and TDM counter 100 directly addresses select RAM 182.

In one embodiment, receive TDM RAM 180 is a 6K×8 dual ported RAM with one write side and one read side. TDM RAM 180 stores incoming CT/ST-Bus data and provides selected data to TDM bus 44, essentially serving as the "switch" within ASIC device 42. Data for each incoming CT/ST bus time slot ($RX_{13}$ RAM(7:0)) is sequentially written to write port 184, stored, and "switched" to an appropriate TDM bus time slot according to the manner in which the data is read from read port 186. Data for any CT/ST bus time slot may be switched or otherwise associated with any TDM bus time slot. Once it has been read, the switched data ($TDM_{13}$ D(7:0)) is communicated from TDM RAM 180 to I/O buffer 54 and onto TDM bus 44. In a particular embodiment, the maximum data rate to write port 184 is approximately 16.384 MHz to support 2,048 time slots per 125 µs CT/ST bus frame, and the maximum data rate from read port 186 is approximately 32.768 MHz to support 4,096 time slots per 125 µs TDM bus frame. The input and output data rates for TDM RAM 180 may depend on selected CT/ST bus and TDM bus operating modes.

As shown in FIG. 9, TDM RAM 180 provides a "triple bucket" approach, with sequential writes occurring to a first bucket or other portion 188 of TDM RAM 180 for a complete current CT/ST bus frame while "random" reads occur, according to input from select RAM 182, from a second bucket 190, a third bucket 192, or both second bucket 190 and third bucket 192 of TDM RAM 180 for one or more previous CT/ST bus frames. Substantially simultaneous reads from third bucket 192 are reads of data from the CT/ST bus frame directly preceding the current frame. Substantially simultaneous reads from second bucket 190 are reads of data from the CT/ST bus frame preceding the current frame by two frames. Since there is a time lag between generation of a TDM frame pulse 92 at TDM bus control section 76 and generation of a CT/ST bus frame at CT/ST bus control section 78, which in one embodiment is a specified number of clock cycles and remains fixed during operation of ASIC 42, reads of data from second bucket 190 will typically be completed and reads from third bucket 192 will begin while first bucket 188 is still being written. The triple bucket approach of TDM RAM 180 allows for the time it takes data to propagate through receive data path 58 before reaching TDM RAM 180. If a double bucket approach was used instead, simultaneous write and read access to a common storage location within TDM RAM 180 would be likely to occur, compromising data integrity and yielding highly undesirable results. The triple bucket approach associated with TDM RAM 180 prevents such consequences from occurring while maintaining proper frame alignment of the data, providing an important technical advantage.

Figure 10:
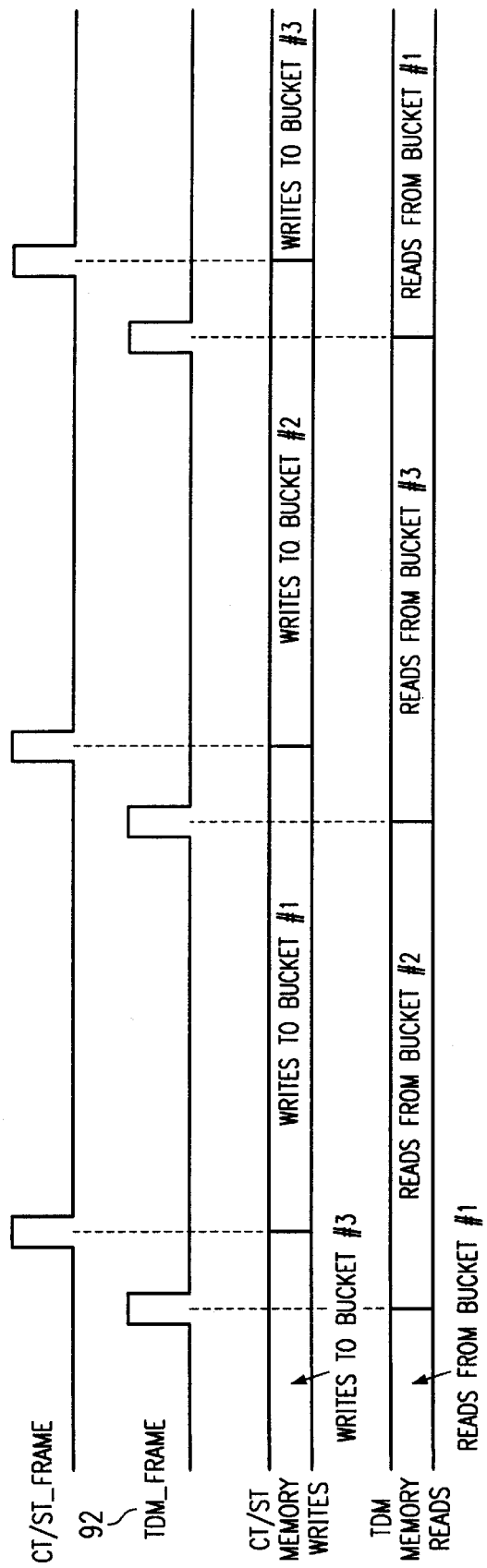
FIG. 10 illustrates example timing for writes and reads associated with a triple bucket RAM.

On the write side, each bucket of TDM RAM 180 may store data for a complete CT/ST bus frame and is sequentially written using write port 184, with CT/ST time slot counter 102 providing the address. Writes begin to a different bucket 188, 190, or 192 on each new CT/ST bus frame and cycle through buckets 188, 190, and 192 as CT/ST bus frames are received. On the read side, each bucket of TDM RAM 180 provides random read access, through read port 186, to the data for any CT/ST bus time slot in a previous CT/ST bus frame. Receive select RAM 182 provides addressing for read port 186. Reads occur randomly from only one bucket 188, 190, or 192 of TDM RAM 180 at a time and sequence through successive buckets at the start of each new TDM frame. As a result, as illustrated in FIG. 10, reads cycle through buckets or other portions 188, 190, and 192 according to TDM frame pulses 92, one bucket every 125 µs, with reads staying at least one and perhaps as many as two buckets behind writes to ensure data integrity. Data output from TDM RAM 180 is communicated to I/O buffer 54, along with a TDM output enable bit ($TDM_{13}$ OE) 196 from select RAM 182, which is a 1 bit field to control tri-state of and to enable a TDM bus driver for the corresponding TDM bus time slot.

TDM RAM 180 also receives appropriate input from receive select RAM 182, which provides addressing for read port 198. This input determines, for each successive TDM bus time slot, the stored data to be "switched" or otherwise associated with that TDM bus time slot and then communicated to I/O buffer 54 and TDM bus 44. In one embodiment, select RAM 182 is a 4K×12 dual ported RAM having one write/read side and one read only side. The input data rate to write/read port 194 from the CPU 36 is determined according to call setup and call teardown commands from CPU 36, may be variable during the operation of ASIC device 42, and may be slower than data rates associated with some other portions of ASIC device 42. In a particular embodiment in which ASIC device 42 supports 4,096 time slots per 125 µs TDM bus frame, the output data rate from select RAM 182 may be approximately 32.768 MHz to support mapping of data for any CT/ST bus time slot to any TDM bus time slot, depending on the selected TDM bus operating mode. TDM output enable bit 196 is stored in select RAM 182 and passed with the associated data from TDM RAM 180 to I/O buffer 54.

In one embodiment, on the write/read side, select RAM 182 receives from CPU interface 82 and stores in each of its storage locations a 12 bit field. This field is used to specify which CT/ST bus data is switched or otherwise associated with each TDM bus time slot and then communicated to I/O buffer 54. On the read side, TDM time slot counter 100 sequentially addresses select RAM 182. An 11 bit address field is used to address or otherwise specify the particular CT/ST bus data for the TDM bus time slot from among all the CT/ST bus data stored in the particular bucket of TDM RAM 180 currently being read. The 11 bit address field is combined with a 2 bit bucket control field 199, received from TDM bus control section 76, to address each of the 6K words stored in TDM RAM 180. The twelfth bit is the TDM output enable bit 196 described more fully above. In one embodiment, writing to select RAM 182 occurs only during call setup and call teardown and, therefore, simultaneous writing to and reading of select RAM 182 may occur only during call setup and call teardown. Since this should not compromise call data integrity, it is not an issue of significant concern from a system perspective.

In operation of switching unit 10 with respect to ASIC device 42, CPU 36 uses CPU interface 82 to configure and otherwise initialize ASIC device 42, select TDM bus and CT/ST bus operating modes, verify frame and clock synchronization, and perform any other operations necessary to prepare ASIC device 42 to process call data. As part of the initialization process, CPU 36 statically or otherwise programs transmit gain/law translation RAM 120 and receive gain/law translation RAM 160 with suitable gain/law conversion information, which in one embodiment does not change during operation of ASIC device 42. Once ASIC device 42 is ready to process call data, and in response to one or more incoming calls, CPU 36 begins receiving call setup commands. For each call to be processed, CPU 36 uses CPU interface 82 to write information to transmit select RAM 106 and to receive select RAM 182 appropriate to specify the switching of data from TDM bus to CT/ST bus time slots and from CT/ST to TDM bus time slots, respectively. CPU 36 also writes associated CT/ST output enable bit 118 to transmit select RAM 106 and associated TDM bus output enable bit 196 to receive select RAM 182. In addition, CPU 36 also uses CPU interface 82 to write gain/law code 126 and gain/law code 166 for the call to transmit gain/law setup RAM 124 and receive gain/law setup RAM 162, respectively.

Although the operation of ASIC device 42 is described primarily with respect to typical duplex calls, the present invention contemplates using transmit data path 56 only or receive data path 58 only for processing of a simplex call, according to particular needs. For a simplex call, CPU 36 may program only those RAMs associated with the appropriate leg of the call. For example only and without limitation, for a simplex call associated with transmit data path 56 only, such as for tone generation or other suitable signaling information, CPU 36 may write information to transmit select RAM 106 and transmit gain/law setup RAM 124 but not to the unneeded receive select RAM 182 and receive gain/law setup RAM 164. Conversely, for a simplex call associated with receive data path 58 only, such as for monitoring of calls at an operations management center, CPU 36 may write information to receive select RAM 182 and receive gain/law setup RAM 164 but not to the unneeded transmit select RAM 106 and transmit gain/law setup RAM 124.

In response to a call teardown command, CPU 36 generally need not write to transmit gain/law setup RAM 124 and receive gain/law setup RAM 164 to change the stored gain/law codes 126 and 166, respectively, since corresponding storage locations may simply be overwritten with new gain/law codes 126 and 166, respectively, when another call is to be processed using the time slot. Analogously, CPU 36 generally need not write to transmit select RAM 106 and receive select RAM 182 to change the stored TDM bus to CT/ST bus time slot and CT/ST bus to TDM bus time slot switching information, respectively. In one embodiment, to teardown the call CPU 36 need only disable the CT/ST bus and TDM bus drivers for the associated time slot by changing CT/ST output enable bit 118 and TDM output enable bit 196, respectively.

In operation of ASIC device 42 with respect to transmit data path 56, assuming ASIC device 42 has been initialized, TDM time slot counter 100 receives system clock signal 90 from clock control section 80 and frame pulses 92 from TDM control section 76, counts according to system clock signal 90 to maintain a current TDM bus time slot location within each TDM frame being processed, and clears to time slot "0" in response to each frame pulse 92 received. Similarly, CT/ST time slot counter 102 receives system clock signal 90 and TDM frame pulses 92, counts according to system clock signal 90 to maintain a current CT/ST bus time slot location in each CT/ST frame being processed, and clears to time slot "0" in response to each frame pulse 92 received. Transmit TDM RAM 104 receives the data for each outgoing TDM bus time slot from TDM bus 44 and I/O buffer 54. Counter 100 addresses TDM RAM 104 to maintain sequential write order and, according to this timing, data for each outgoing TDM bus time slot is sequentially written to and stored in one bucket 112 or 114 of TDM RAM 104.

CPU 36 writes a 13 bit or other suitable word to transmit select RAM 106 using write/read port 116. In one embodiment, as described more fully above, the 13 bit word from CPU 36 includes a 12 bit address field that used to directly address buckets 112 and 114 of TDM RAM 104 to select the stored data to be switched to each CT/ST bus time slot. The 13 bit word also includes CT/ST bus output enable bit 118 that will pass with the data to enable the CT/ST bus driver for the time slot. Select RAM 106 stores the 13 bit word in a suitable location. CT/ST time slot counter 102 addresses select RAM 106 to maintain a sequential read order and, according to this timing, select RAM 106 addresses TDM RAM 104 to "switch" or otherwise associate stored TDM bus data with the desired CT/ST bus time slots. According to the addressing from select RAM 106, resulting "random" reads of the TDM bus data occur from the other bucket 114 or 112 of TDM RAM 104 that is not currently being written. These reads may occur in thirty-two word bursts, sixteen word bursts, or in any other appropriate manner, depending on the number of CT/ST bus channels being used. The data for each CT/ST bus time slot is sequentially communicated to gain/law section 64.

Substantially simultaneous to dynamically programming transmit select RAM 106 or at any other appropriate time, CPU 36 dynamically programs or otherwise loads gain/law setup RAM 106 with 5 bit or other suitable gain/law code 126 for each time slot, channel, or call. CT/ST time slot counter 102 addresses the read only side of setup RAM 124 to maintain sequential read order from setup RAM 124 relative to the outgoing data for the sequential CT/ST bus time slots. Setup RAM 124 communicates the 5 bit or other suitable gain/law code 126 for each CT/ST bus time slot to translation RAM 120 to address translation RAM 120. Gain/law code 126 and the associated 8 bit data field read from TDM RAM 104 are combined for each CT/ST bus time slot and used to address translation RAM 120, which applies the specified gain/law conversion to the data and passes the resulting modified data to CT/ST section 66.

Parity generator/checker 122 generates a parity bit on each write to translation RAM 120 and stores the parity bit in translation RAM 120 in association with the look-up table information. After application of the specified gain/law conversion to the data, parity generator/checker 122 will evaluate the resulting 9 bit field to determine whether parity is valid and report to CPU 36 if parity is invalid. CT/ST section 66 receives the 8 bit data field from gain/law section 64 and stores the data sequentially in thirty-two or other suitable number of holding registers 140. Holding registers 140 simultaneously load parallel to serial converters 142, which then convert the data from parallel to serial streams and serially shift out the data at the programmed data rate onto CT/ST bus 46. CT/ST output enable signal 118, having been passed with the data through portions of transmit data path 56, enables the driver for the corresponding CT/ST bus time slot to allow the data to be communicated to CT/ST bus 46.

In operation of ASIC device 42 with respect to the receive data path 58, receive CT/ST section 70 receives incoming data from CT/ST bus 46 and converts the data from serial to parallel streams using thirty-two or other suitable number of serial to parallel converters 146. The incoming data is stored synchronously in corresponding holding registers 148, one holding register 148 for each stream, sequentially read out of holding registers 148, and communicated to receive gain/law section 72.

During initialization of ASIC device 42, during or after initialization of service provider 14, CPU 36 statically programs or otherwise loads gain/law translation RAM 160 and dynamically programs or otherwise loads gain/law setup RAM 106 with 5 bit or other suitable gain/law code 126 for each time slot, channel, or call. CT/ST time slot counter 102 addresses the read only side of setup RAM 164 to maintain sequential read order from setup RAM 164 relative to incoming data for CT/ST bus time slots. Setup RAM 164 communicates gain/law code 166 for each CT/ST bus time slot to gain/law translation RAM 160 to address translation RAM 160.

For each CT/ST bus time slot, the 5 bit gain/law code 166 and the corresponding 8 bit data field received from CT/ST section 70 are combined and then used to address translation RAM 160, which applies the specified gain/law conversion to the data and passes the resulting modified data to TDM section 74. Parity generator/checker 162 generates a parity bit on each write to translation RAM 160 and stores the parity bit in translation RAM 120 in association with the look-up table information. After application of the specified gain/law conversion to the data, parity generator/checker 122 evaluates the resulting 9 bit field to determine whether parity is valid and reports to CPU 36 if parity is invalid.

Receive TDM RAM 180 receives data for each incoming CT/ST bus time slot from gain/law section 72 and sequentially stores the data in one of three buckets 188, 190, and 192 using write port 184. CPU 36 writes a 13 bit or other appropriate word to receive select RAM 182 using write/read port 194. In one embodiment, as described more fully above, the 13 bit word from CPU 36 includes a 12 bit address field used to directly address buckets 188, 190, and 192 of TDM RAM 180 to select the stored data to be switched to each TDM bus time slot. The 13 bit word further includes TDM bus output enable bit 196 to enable the corresponding TDM bus driver for that time slot. Select RAM 182 stores the word in an appropriate location. TDM time slot counter 100 addresses select RAM 182 to maintain a sequential read order and, according to this timing, select RAM 182 addresses TDM RAM 180 to "switch" or otherwise associate stored CT/ST bus data with the desired TDM bus time slots. According to addressing from select RAM 182, resulting "random" reads of the CT/ST bus data occur from one or both of the buckets 188, 190, and 192 of TDM RAM 180 that are not currently being written. Once read from TDM RAM 180, the data is passed with TDM output enable bit 196 and communicated to I/O buffer 54 and onto TDM bus 44.

Figure 11:
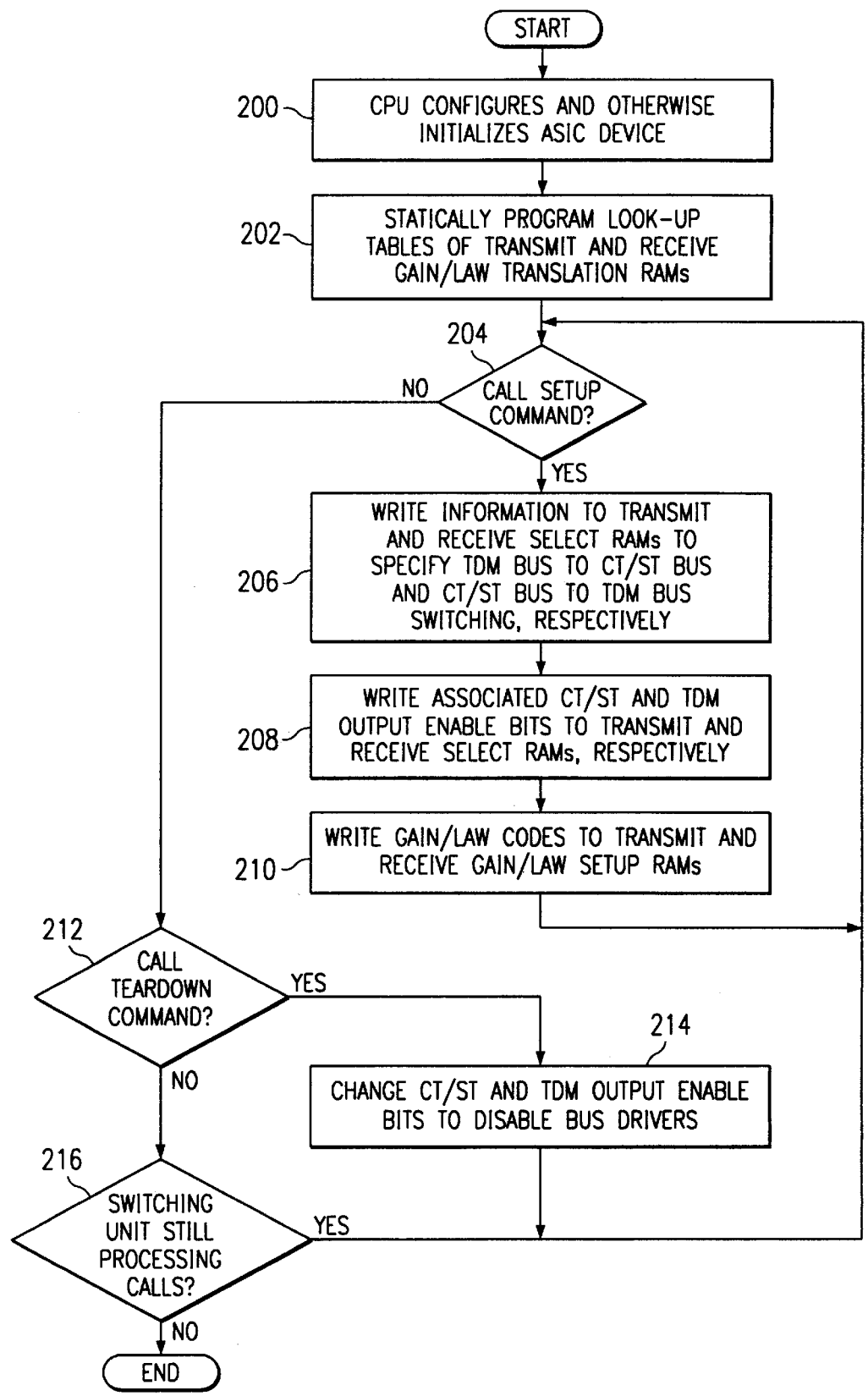
FIG. 11 is a flow chart illustrating the example operation of a switching system with respect to an ASIC device.

FIG. 11 is a flow chart illustrating an example method of switching data within switching unit 10 using ASIC device 42. The method begins at step 200, where CPU 36 uses CPU interface 82 to configure and otherwise initialize ASIC device 42, which may include selecting TDM bus and CT/ST bus operating modes, verifying frame and clock synchronization, and performing any other operations necessary to prepare ASIC device 42 to process call data. In particular, as part of the initialization process, CPU 36 statically or otherwise programs transmit gain/law translation RAM 120 and receive gain/law translation RAM 160 at step 202 with suitable gain/law conversion information, which in one embodiment does not change during the operation of ASIC device 42. Once ASIC device 42 is ready to begin processing call data, and in response to an incoming call, CPU 36 may receive a call setup command at step 204.

If a call setup command has been received at step 204, CPU 36 uses the CPU interface 82 at step 206 to write information to transmit select RAM 106 and to receive select RAM 182 appropriate to specify the switching of data from TDM bus to CT/ST bus time slots and from CT/ST to TDM bus time slots, respectively. CPU 36 also writes, at step 208, associated CT/ST output enable bit 118 to transmit select RAM 106 and associated TDM bus output enable bit 196 to receive select RAM 182. In addition, at step 210, CPU 36 also uses CPU interface 82 to write gain/law code 126 and gain/law code 166 for the call to transmit gain/law setup RAM 124 and receive gain/law setup RAM 162, respectively. Steps 206 through 210 may occur serially, in any appropriate order, substantially simultaneously, or in any other appropriate manner and writes to components of transmit data path 56 may occur before, substantially simultaneous with, or after the writes to analogous components of receive path 58. In one embodiment, at least steps 206 and 208 occur substantially simultaneously when CPU 36 writes 13 bit words each containing switching information and an output enable bit to transmit and receive select RAMs 106 and 182, respectively. After step 210 has been completed, the method returns to step 204.

If no call setup command has been received at step 204, the method proceeds to step 212. If a call teardown command is received at step 212, CPU 36 changes both CT/ST output enable bit 118 and TDM output enable bit 196 at step 214 to disable the CT/ST bus and TDM bus drivers, respectively, for the associated time slot. The method then returns to step 204. If no call teardown command is received at step 212, and switching unit 10 is still processing calls at step 216, the method returns to step 204. If switching unit 10 is no longer processing calls at step 216, the method ends. Those skilled in the art appreciate that ASIC device 42 may process data for multiple calls simultaneously. For example, in the particular embodiment in which switching unit 10 supports 4,096 ports or other network interfaces, TDM bus 44 supports 4,096 time slots, and CT/ST bus 46 supports 2,048 time slots, ASIC device 42 may process call data for up to 2,048 calls simultaneously. As discussed at numerous places above, the present invention contemplates processing data for any number of time slots, channels, and calls using any number of internally switching and externally switching ASIC devices 42, according to particular needs.

Figure 12A:
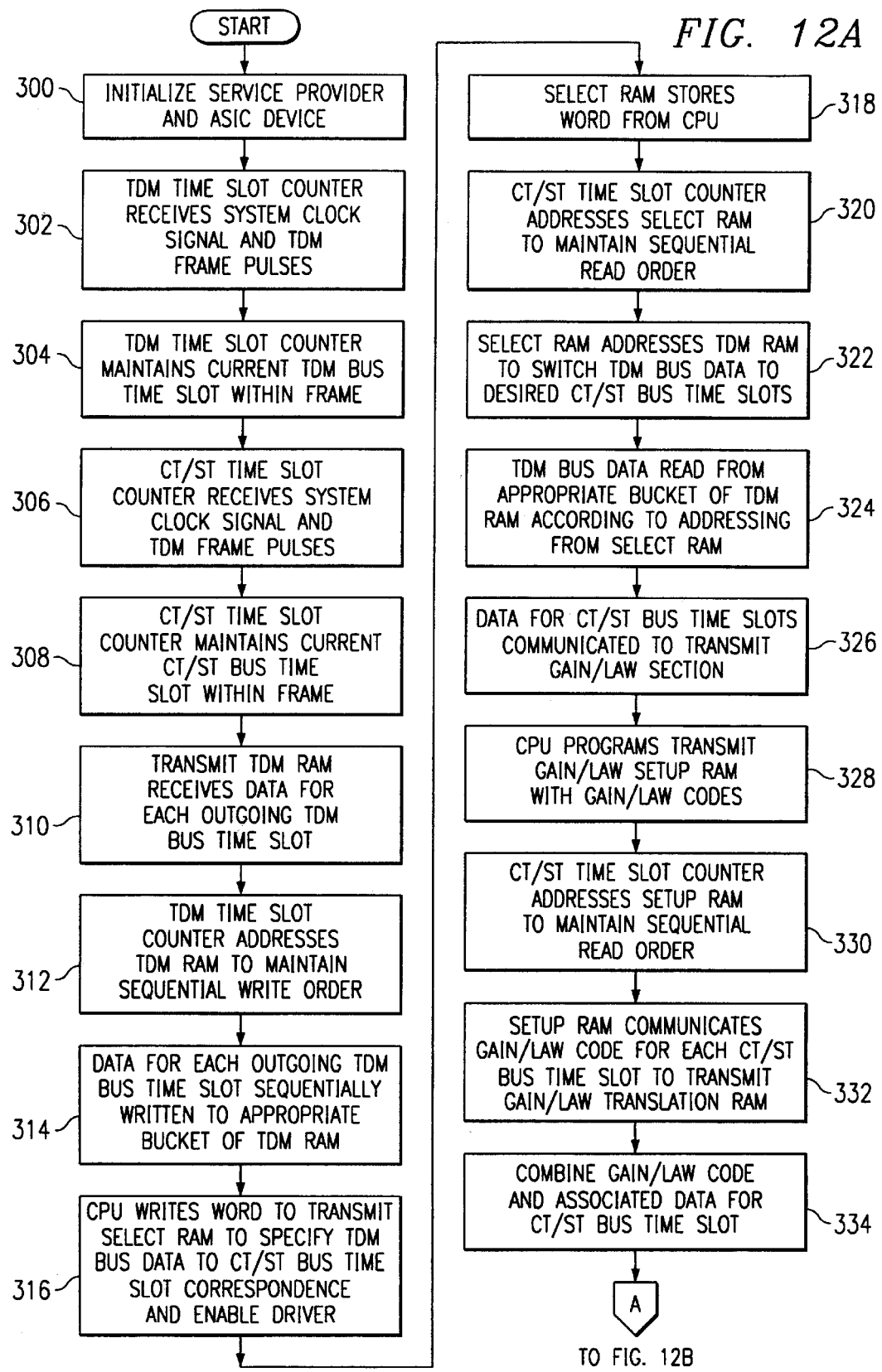
FIGS. 12A and 12B are a flow chart illustrating an example method of switching data from a TDM bus to a CT/ST bus through a transmit data path.
Figure 12B:
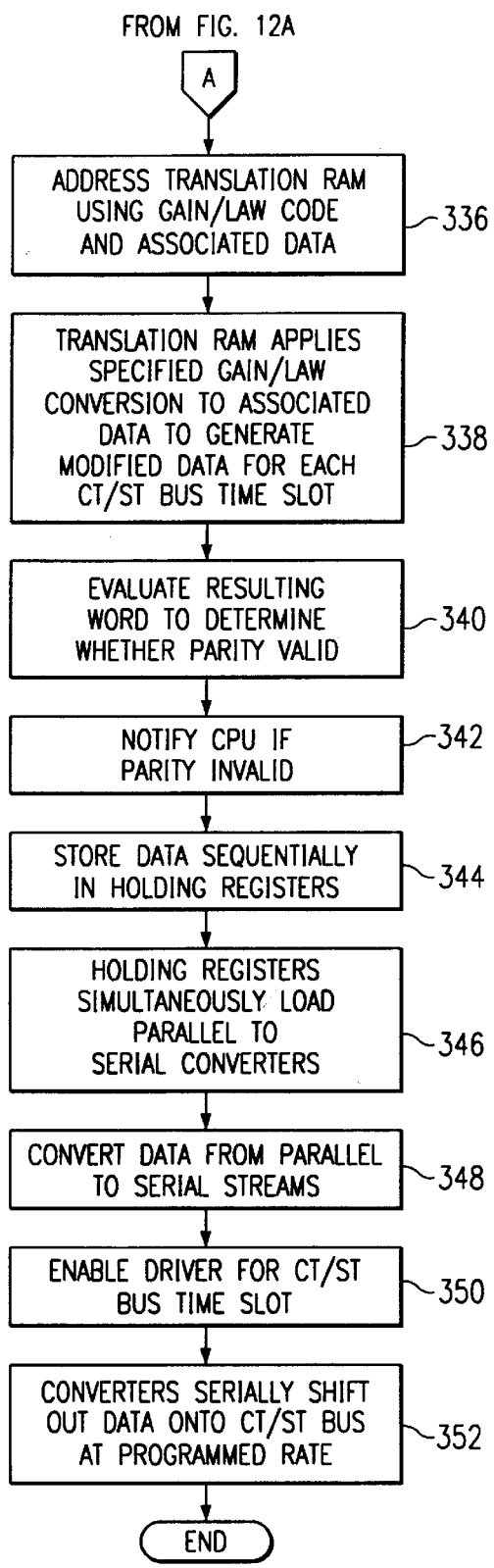

FIGS. 12A and 12B are a flow chart illustrating an example method of switching data from TDM bus 44 to CT/ST bus 46 through transmit data path 56. The method is described assuming ASIC device 42 has been fully initialized in the manner described above. In particular, the method is described assuming CPU 36 has statically programmed transmit gain/law translation RAM 120 and receive gain/law translation RAM 160 with suitable gain/law conversion information. The method is also described assuming parity generator/checker 122 has stored a parity bit in association with each gain/law conversion in translation RAMs 120 and 160.

The method begins at step 300, where service provider 14 and associated ASIC devices 42 are initialized, during or subsequent to initialization of switching unit 10. At step 302, TDM time slot counter 100 receives system clock signal 90 from clock control section 80 and receives frame pulses 92 from TDM control section 76. Counter 100 counts according to system clock signal 90 at step 304 to maintain the current TDM bus time slot location within each TDM frame being processed, clearing to time slot "0" in response to each new frame pulse 92 received. Similarly, at step 306, CT/ST time slot counter 102 receives system clock signal 90 and TDM frame pulses 92. Counter 102 counts according to system clock signal 90 at step 308 to maintain a current CT/ST bus time slot location in each CT/ST frame being processed, clearing to time slot "0" in response to each frame pulse 92 received. At step 310, transmit TDM RAM 104 receives the data for each outgoing TDM bus time slot from TDM bus 44 and I/O buffer 54. At step 312, counter 100 addresses TDM RAM 104 to maintain sequential write order and, according to this timing, at step 314 the data for each outgoing TDM bus time slot is sequentially written to and stored in one bucket 112 or 114 of TDM RAM 104.

At step 316, CPU 36 writes a 13 bit or other appropriate word to transmit select RAM 106 using write/read port 116. In one embodiment, as described above, the 13 bit word from CPU 36 includes a 12 bit address field used to directly address buckets 112 and 114 of TDM RAM 104 to select the stored TDM bus data to be switched to each CT/ST bus time slot—in essence specifying the TDM bus data to CT/ST bus time slot correspondence. The 13 bit word also includes CT/ST bus output enable bit 118 that is passed with the data to enable the CT/ST bus driver for the time slot. Select RAM 106 stores the 13 bit word in a suitable location at step 318. At step 320, CT/ST time slot counter 102 addresses select RAM 106 to maintain sequential read order and, in accordance with this timing, at step 322 select RAM 106 addresses TDM RAM 104 to "switch" or otherwise associate stored TDM bus data with the desired CT/ST bus time slots. At step 324, according to addressing from select RAM 106, resulting "random" reads of the TDM bus data occur from the other bucket 114 or 112 of TDM RAM 104 not currently being written. These reads may occur in thirty-two bursts, sixteen word bursts, or in any other suitable manner depending on the number of CT/ST bus channels being used. At step 326, the data for each CT/ST bus time slot is sequentially communicated through transmit data path 56 to transmit gain/law section 64.

Substantially simultaneous to dynamically programming transmit select RAM 106 at step 316 or at another suitable time, CPU 36 dynamically programs or otherwise loads gain/law setup RAM 106 at step 328 with 5 bit or other suitable gain/law code 126 for each time slot, channel, or call. At step 330, CT/ST time slot counter 102 addresses the read only side of setup RAM 124 to maintain sequential read order from setup RAM 124 relative to outgoing data for the sequential CT/ST bus time slots. At step 332, setup RAM 124 communicates the 5 bit or other gain/law code 126 for each CT/ST bus time slot to gain/law translation RAM 120 to address translation RAM 120. Gain/law code 126 and the associated 8 bit data field from TDM RAM 104 are combined at step 334 for each CT/ST bus time slot and are used to address translation RAM 120 at step 336. At step 338, translation RAM 120 applies the gain/law conversion specified by gain/law code 126 to the corresponding data to generate modified data.

After translation RAM 120 has applied the specified gain/law conversion to the data, parity generator/checker 122 evaluates the resulting 9 bit field at step 340 to check whether parity is valid and then notifies CPU 36 at step 342 if parity is invalid. At step 344, CT/ST section 66 receives the data from gain/law section 64 and stores the data sequentially in thirty-two or another suitable number of holding registers 140. At step 346, holding registers 140 simultaneously load parallel to serial converters 142, which convert the data from parallel to serial streams at step 348. CT/ST output enable bit 118, having been passed with the data through portions of transmit data path 56, enables the driver for the corresponding CT/ST bus time slot at step 350 to allow the data to be communicated to CT/ST bus 46. Therefore, at step 352, converters 142 serially shift out the data at the programmed outgoing CT/ST bus data rate onto CT/ST bus 46, and the method ends.

Figure 13A:
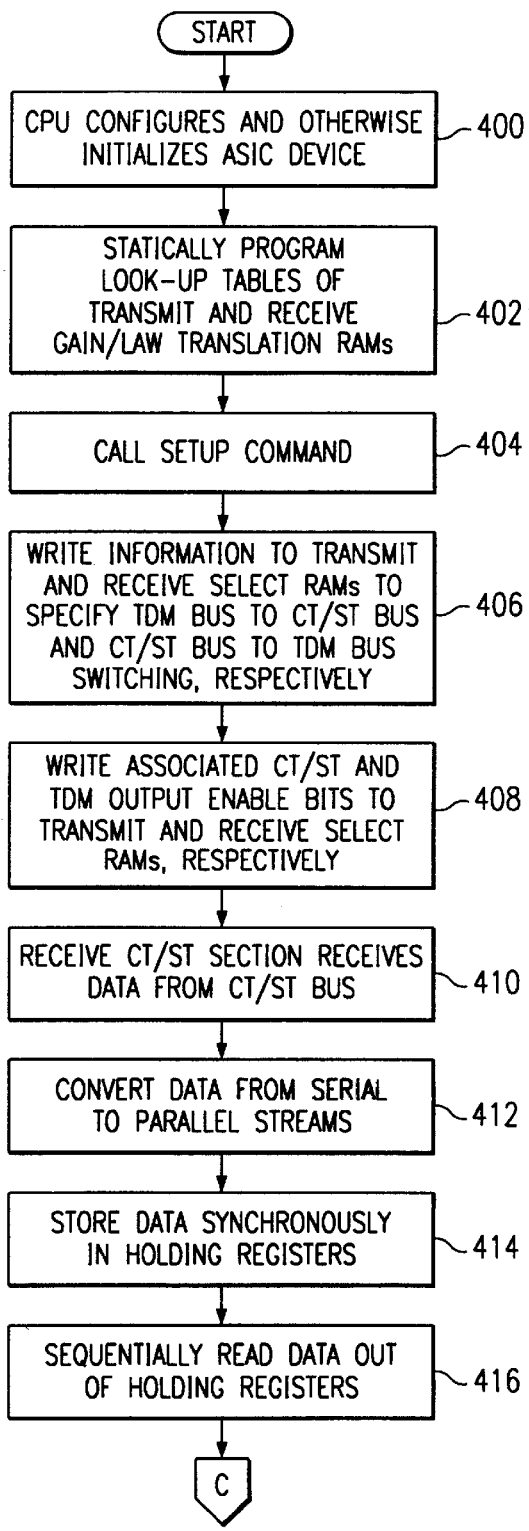
FIGS. 13A and 13B are a flow chart illustrating an example method of switching data from a CT/ST bus to a TDM bus through a receive data path.
Figure 13B:
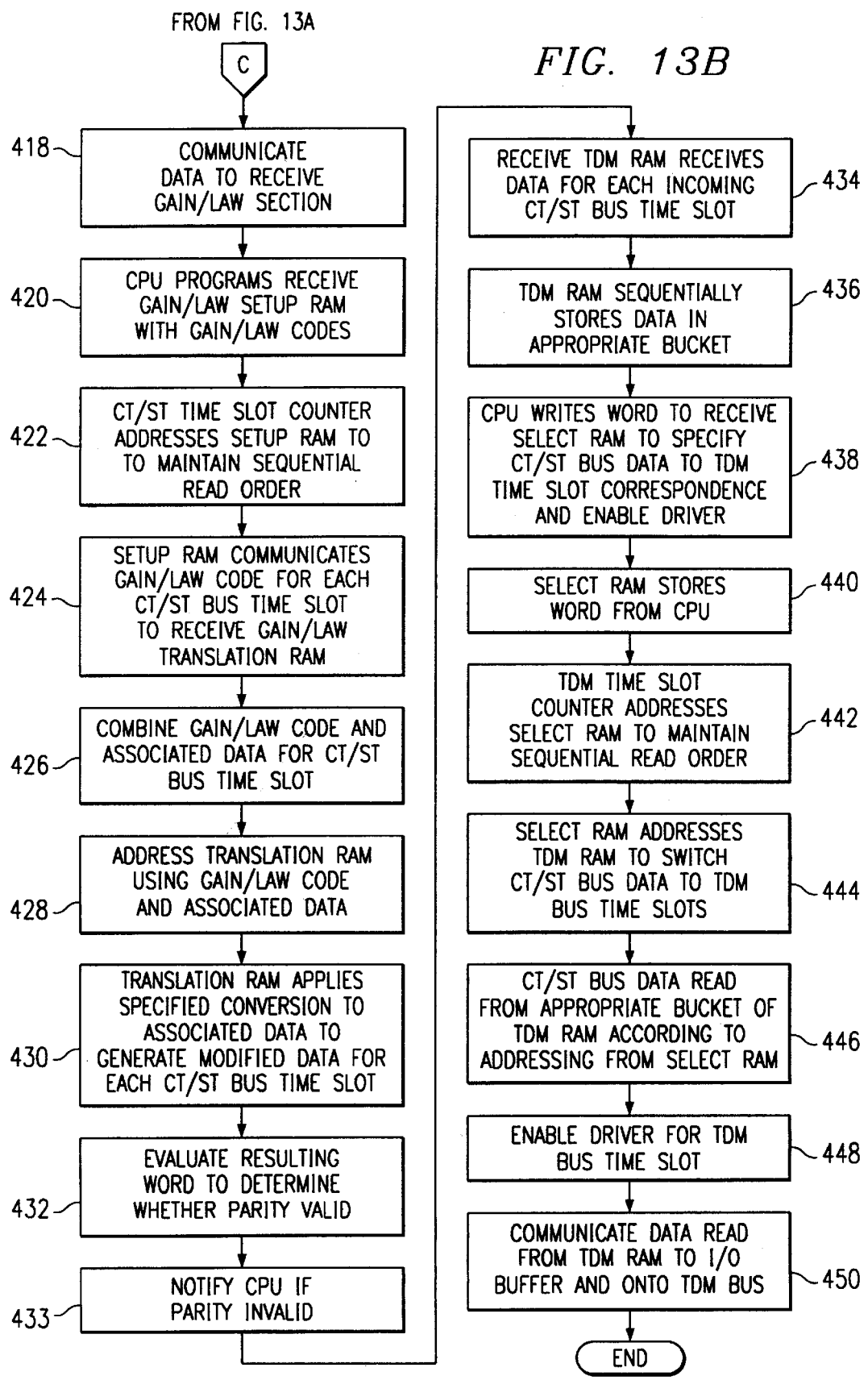

FIGS. 13A and 13B are a flow chart illustrating an example method of switching data from CT/ST bus 46 to TDM bus 44 through receive data path 58. The method is described assuming ASIC device 42 has been fully initialized in the manner described above. In particular, the method is described assuming CPU 36 has statically programmed transmit gain/law translation RAM 120 and receive gain/law translation RAM 160 with suitable gain/law conversion information. The method is also described assuming parity generator/checker 122 has stored a parity bit in association with each gain/law conversion in translation RAMs 120 and 160.

The method begins at step 400, where service provider 14 and associated ASIC devices 42 are initialized, during or subsequent to initialization of switching unit 10. At step 402, TDM time slot counter 100 receives system clock signal 90 from clock control section 80 and receives frame pulses 92 from TDM control section 76. Counter 100 counts according to system clock signal 90 at step 404 to maintain the current TDM bus time slot location within each TDM frame being processed, clearing to time slot "0" in response to each new frame pulse 92 received. Similarly, at step 406, CT/ST time slot counter 102 receives system clock signal 90 and TDM frame pulses 92. Counter 102 counts according to system clock signal 90 at step 408 to maintain a current CT/ST bus time slot location in each CT/ST frame being processed, clearing to time slot "0" in response to each frame pulse 92 received. Receive CT/ST section 70 receives incoming data from CT/ST bus 46 at step 410 and then converts the incoming data from serial to parallel streams at step 412 using thirty-two or another appropriate number of serial to parallel converters 146. The incoming CT/ST bus data is then stored synchronously in corresponding holding registers 148 at step 414, one for each data stream, sequentially read out of holding registers 148 at step 416, and communicated to receive gain/law section 72 at step 418.

At step 420, CPU 36 dynamically programs or otherwise loads gain/law setup RAM 164 with gain/law codes 166. CT/ST time slot counter 102 addresses the read only side of setup RAM 164 at step 422 to maintain sequential read order from setup RAM 164 relative to incoming data for CT/ST bus time slots. At step 424, setup RAM 164 communicates the 5 bit or other suitable gain/law code 166 for each CT/ST bus time slot to gain/law translation RAM 160 to address translation RAM 160. For each CT/ST bus time slot, the 5 bit gain/law code 166 and the associated 8 bit data field received from CT/ST section 70 are combined at step 426 and then used to address translation RAM 160 at step 428. At step 430, translation RAM 160 applies the gain/law conversion specified by gain/law codes 166 to the corresponding data to generate an 8 bit modified data field. After translation RAM 160 has applied the specified gain/law conversion to the data, parity generator/checker 162 evaluates the resulting 9 bit field at step 432 to determine if parity is valid and notified CPU 36 at step 434 if parity is invalid.

Receive TDM RAM 180 receives data for each incoming CT/ST bus time slot from gain/law section 72 at step 436 and sequentially stores the data in one of three buckets 188, 190, and 192 at step 438 using write port 184. At step 440, CPU 36 writes a 13 bit or other suitable word to receive select RAM 182 using write/read port 194. In one embodiment, as described above, this 13 bit word includes a 12 bit address field used to directly address buckets 188, 190, and 192 of TDM RAM 180 to select the stored CT/ST bus data to be switched to each TDM bus time slot. The 13 bit word further includes TDM bus output enable bit 196 to enable the TDM bus driver for that time slot. At step 440, select RAM 182 stores the word in an appropriate location.

TDM time slot counter 100 addresses select RAM 182 at step 442 to maintain a sequential read order and, in accordance with this timing, at step 444 select RAM 182 addresses TDM RAM 180 to "switch" or otherwise associate the stored CT/ST bus data with the desired TDM bus time slots. According to addressing from select RAM 182, resulting "random" reads of the CT/ST bus data occur at step 446 from one or both of the buckets 188, 190, and 192 of TDM RAM 180 not currently being written. TDM output enable signal 196, having been passed with the data through at least some portions of receive data path 58, enables the driver for the corresponding TDM bus time slot at step 448 to allow the data to be communicated to TDM bus 44. Thus, at step 450, the data read from TDM RAM 180 is communicated to I/O buffer 54 and onto TDM bus 44, and the method ends.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. An application-specific integrated circuit (ASIC) device for switching data from a first bus to a second bus in a switching system, comprising:

a first random access memory (RAM) operable to store a code for each of a plurality of first time slots and to communicate the code for each first time slot;

a second RAM operable to store a plurality of operations, the second RAM operable to receive a combination of the code for each first time slot and corresponding data from the first bus, the combination specifying one of the stored operations, the second RAM operable to apply the specified operation for each first time slot to the data for each first time slot to generate modified data for each first time slot, the second RAM operable to communicate the modified data;

a third RAM operable to store information specifying one of a plurality of second time slots associated with the second bus to correspond to each first time slot, the third RAM operable to communicate the information specifying the second time slot corresponding to each first time slot as an address; and a fourth RAM operable to:

store the modified data for each first time slot of a previous frame;

store the modified data for each first time slot of a current frame;

receive the address for each first time slot of the previous frame, specifying the second time slot corresponding to the first time slot, from the third RAM;

locate the modified data for each first time slot of the previous frame according to the address; and communicate the modified data for each first time slot of the previous frame to the second bus in the corresponding second time slot while the modified data for the current frame is being stored.

2. The ASIC device of claim 1, wherein the first bus is a serial data bus and the second bus is associated with a TDM backplane.

3. The ASIC device of claim 1, wherein the code comprises a gain/law code, the gain/law code comprising one bit specifying a first law conversion, one bit specifying a second law conversion, and three bits specifying a gain level.

4. The ASIC device of claim 1, wherein the operations are stored statically in the second RAM during initialization of the ASIC device.

5. The ASIC device of claim 1, wherein the device is operable to specify operations a per call basis using the codes.

6. The ASIC device of claim 1, wherein communicating the modified data for the previous frame while the modified data for the current frame is being stored prevents simultaneous read and write access to a common storage location in the fourth RAM.

7. The ASIC device of claim 1, wherein the fourth RAM comprises first, second, and third buckets, the fourth RAM further operable to:

sequentially store the modified data for each first time slot of the previous frame in the first bucket;

sequentially store the modified data for each first time slot of the current frame in the third bucket; and communicate the modified data for each first time slot of the previous frame from the first bucket while at least some of the modified data for the current frame is being stored in the third bucket.

8. The ASIC device of claim 7, wherein communicating modified data for the previous frame from the first bucket while modified data for the current frame is being stored in the third bucket prevents Simultaneous read and write access to a common storage location in the first bucket.

9. The ASIC device of claim 7, wherein writes to the fourth RAM remain at least one and at most two buckets ahead of reads to the fourth RAM.

10. A method for switching data within switching system from a first bus to a second bus using at least one application-specific integrated circuit (ASIC) device, comprising:

storing a plurality of operations;

storing a code for each of a plurality of first time slots;

communicating the code for each first time slot in combination with corresponding data from the first bus to specify one of the stored operations;

receiving the combined data and code for each first time slot;

applying the specified operation for each first time slot to the data for each first time slot to generate modified data for each first time slot;

storing information specifying one of a plurality of second time slots associated with the second bus to correspond to each first time slot;

communicating the information specifying the second time slot corresponding to each first time slot as an address;

storing the modified data for each first time slot of a previous frame in a random access memory (RAM);

storing the modified data for each first time slot of a current frame in the RAM;

locating the modified data for each first time slot of the previous frame in the RAM according to the address specifying the second time slot corresponding to the first time slot; and communicating the modified data for each first time slot of the previous frame from the RAM to the second bus in the corresponding second time slot while the modified data for the current frame is being stored in the RAM.

11. The method of claim 10, wherein the first bus is a serial data bus and the second bus is associated with a TDM backplane.

12. The method of claim 10, wherein the code comprises a gain/law code, the gain/law code comprising one bit specifying a first law conversion, one bit specifying a second law conversion, and three bits specifying a gain level.

13. The method of claim 10, wherein the operations are stored statically during initialization of the ASIC device.

14. The method of claim 10, wherein operations are specified on a per call basis according to the codes.

15. The method of claim 10, wherein communicating the modified data for the previous frame while the modified data for the current frame is being stored further comprises preventing simultaneous read and write access to a common storage location in the RAM.

16. The method of claim 10, wherein:

the RAM comprises first, second, and third buckets;

the modified data for each first time slot of the previous frame is sequentially stored in the first bucket;

the modified data for each first time slot of the current frame is sequentially stored in the third bucket; and the modified data for each first time slot of the previous frame is communicated from the first bucket while at least some of the modified data for the current frame is being stored in the third bucket.

17. The method of claim 16, wherein communicating modified data for the previous frame from the first bucket while modified data for the current frame is being stored in the third bucket prevents simultaneous read and write access to a common storage location in the first bucket.

18. The method of claim 16, wherein writes to the RAM remain at least one and at most two buckets ahead of reads from the RAM.

* * * * *

UNITED STATES PATENT AND TRADEMARK OFFICE
CERTIFICATE OF CORRECTION

PATENT NO. : 6,785,270 B1
DATED : August 31, 2004
INVENTOR(S) : Brent K. Parrish et al.

It is certified that error appears in the above-identified patent and that said Letters Patent is hereby corrected as shown below:

<u>Column 24,</u>
Line 14, after "operations", insert -- on --.
Line 35, after "prevents", delete "Simultaneous", and insert -- simultaneous --.

Signed and Sealed this

Eighth Day of February, 2005

JON W. DUDAS
*Director of the United States Patent and Trademark Office*